United States Patent [19]

Keating

[11] Patent Number: 5,206,919
[45] Date of Patent: Apr. 27, 1993

[54] IMAGE SIGNAL PROCESSING WITH DIGITAL FILTERING TO MINIMIZE ALIASING CAUSED BY IMAGE MANIPULATION

[75] Inventor: Stephen M. Keating, Reading, England

[73] Assignee: Sony Broadcast & Communications Limited, Viables, England

[21] Appl. No.: 690,579

[22] Filed: Apr. 24, 1991

[30] Foreign Application Priority Data

May 30, 1990 [GB] United Kingdom ............... 9012025

[51] Int. Cl.$^5$ .................................................. G06K 9/36
[52] U.S. Cl. ........................................ 382/46; 382/47;
340/727; 340/731; 358/451; 395/137; 395/139
[58] Field of Search ............... 395/142, 143, 137, 139,
395/135; 382/47, 46; 358/22, 451, 447;
340/731, 727

[56] References Cited

U.S. PATENT DOCUMENTS

| | | | |
|---|---|---|---|
| 4,602,285 | 7/1986 | Beaulier et al. | 382/47 |
| 4,656,467 | 4/1987 | Strolle | 340/727 |
| 4,665,433 | 5/1987 | Hinson et al. | |
| 4,667,236 | 5/1987 | Dresdner | 340/727 |
| 4,752,828 | 6/1988 | Chapuis et al. | 395/137 |
| 4,760,605 | 7/1988 | David et al. | 382/47 |
| 4,985,849 | 1/1991 | Hideaki | 395/137 |
| 5,050,225 | 9/1991 | Itoh | 382/46 |
| 5,113,455 | 5/1992 | Scott | 382/47 |

FOREIGN PATENT DOCUMENTS

| | | |
|---|---|---|
| 2160051 | 12/1985 | United Kingdom . |
| 2172167A | 9/1986 | United Kingdom . |
| 2183118A | 5/1987 | United Kingdom . |
| 2184316 | 6/1987 | United Kingdom . |
| 2197766 | 5/1988 | United Kingdom . |

Primary Examiner—Michael T. Razavi
Assistant Examiner—Steven P. Klocinski
Attorney, Agent, or Firm—Alvin Sinderbrand; William S. Frommer

[57] ABSTRACT

An image signal processing apparatus has an address generator that generates addresses for successive words of a digital input signal representing an input image to be manipulated. A computation circuit monitors the addresses for successive word sets which each comprise first and second words relatively horizontally spaced in the input image and a third word aligned vertically with the second word, and computes from each set both horizontal and vertical local scaling factors representing the extent of compression in the horizontal and vertical directions of a corresponding local area of the manipulated image. A bandwidth controller is responsive to the successive scaling factors to vary the horizontal and vertical bandwidths of a digital filter which two-dimensionally filters the input image, thereby to minimize aliasing that would be caused by the manipulation of the local areas. The computation circuit computes the scaling factors for each local area such that the horizontal factor corresponds to the length of a line that extends perpendicularly from a line passing through the positions of the second and third words in the manipulated image to the position of the first word and the vertical factor corresponds to the length of a line that extends perpendicularly from a line passing through the positions of the first and second words to the position of the third word.

14 Claims, 10 Drawing Sheets

IMAGE SIGNAL PROCESSING WITH DIGITAL FILTERING TO MINIMIZE ALIASING CAUSED BY IMAGE MANIPULATION

BACKGROUND OF THE INVENTION

1. Field of the Invention

This invention relates to image signal processing apparatus and methods.

2. Description of the Prior Art

It is known to manipulate an image signal in the spatial domain by mapping words of the signal to produce a mapped image which is manipulated by virtue of the mapping process in a manner dictated by the mapping function that is employed in carrying out the process. Such a technique may, for example, be employed in the creation of digital video effects. The mapping process may involve compression and/or rotation of the image. Moreover, the extent of compression and/or rotation may vary from area to area of the mapped (manipulated) image. As is explained in more detail below, both compression and rotation may lead to aliasing, which (in the absence of preventive measures) will cause degradation of the image.

In more detail, FIG. 1 of the accompanying drawings shows, in outline, an image processing apparatus that can be used, for example in the creation of digital video effects, to map an image signal into a memory in accordance with a desired mapping function in order to manipulate or transform the image into a desired form. An input image or picture signal is applied to an input port or terminal 10 of a memory shown schematically at 12. The input image signal comprises a sequence of digital words (for example 8-bit words) which may comprise digitized samples (sampling frequency [rate] fs) of, for example, a raster scan video signal obtained, for instance, from a television camera. The respective input words or samples are stored in respective locations of the memory 12, which may for example be a field store or a frame store in the case of a video signal, in accordance with addresses allocated to the respective samples by an address generator 14. The address generator 14 generates addresses at the frequency fs in accordance with a mapping function so as to map the samples into the memory 12 in such a manner that, when the contents of the memory are read out to produce an output image signal at the frequency fs on an output port or terminal 16, the output picture or image represented by the output image signal will have been manipulated in appearance, as compared to the input picture or image, in a manner determined by the mapping function, so as to achieve a desired visual effect.

The operation of the arrangement of FIG. 1 will now be described in more detail, considering first a case in which the addresses generated by the address generator 14 are such that no image manipulation is achieved. The address allocated to each sample of the input signal comprises information in coded-bit form which represents or points to the x and y coordinates of a memory location in an x, y coordinate system of which the upper left hand corner of the memory 12 as represented in FIG. 1 can be considered to constitute the origin. Thus, the first sample of the input image signal, which is the first sample of a first line of the image, is allocated an address pointing to a memory location (0, 1), that is a memory location having the address coordinates: x=0, y=1. Successive samples of the first line are allocated addresses corresponding to the memory locations (0,2), (0,3) . . . (0,n), where n is the number of samples per line. The samples of successive lines are allocated addresses (1,1) to (1,n), (2,1) to (2,n) and so forth, up to (m,1) to (m,n) for the last line, where m is the number of lines in the image. At this point, the whole image (for example one field or frame of a video signal) has been stored. The stored image then is read out by outputting the contents of the memory locations in the order (0,1) to (0,n), (1,1) to (1,n) . . . (m,1) to (m,n). As will be apparent, the output image represented by the output image signal is in this case an unmanipulated representation of the input image.

It should, of course, be appreciated that the relative dispositions of the respective memory locations in FIG. 1 are shown schematically and that they need not in practice be relatively disposed in the manner shown in FIG. 1.

A description will now be given, with reference to FIG. 2 of the accompanying drawings, of a case in which the input image is manipulated. In this case, the input image is to be manipulated so that the output image will appear within an area 18 shown in FIG. 2. The area 18, which has been selected arbitrarily to illustrate by way of example the points discussed below, can be considered, for ease of understanding, as a "still" perspective representation of a fluttering flag (and in the case of a video signal could be changed for successive fields or frames so that the image is manipulated in such a manner that its plane is distorted to lie on the surface of a moving fluttering flag). Thus, a three-dimensional effect is achieved.

The address generator 14 is operative in this case to map the successive input samples into memory locations corresponding to the area 18. Thus, the first sample is not in this case stored in the memory location (0,1), but instead is stored in a location (xa,ya). Similarly, the next sample is not stored in the location (0,2), but is stored in a location (xb,yb); and so on. When the image is read out, the memory locations are read in the same order as in the case of FIG. 1, namely in the order (0,1) to (0,n), (1,1) to (1,n) . . . (m,1) to (m,n). Consequently, the output image has been manipulated in that an image which, in the absence of manipulation, would have conformed to the border of the memory 12 as represented in FIG. 2, will instead adopt the form represented by the area 18.

The output image has been subjected to manipulation of two types, namely (i) compression and (ii) rotation.

Considering first compression, in the example illustrated in FIG. 2 the image has been compressed (reduced in size) with respect to the original image in both the horizontal direction (along the lines (scanning lines) of the original or input image) and the vertical direction (transverse to the lines of the original or input image). Overall, the degree of compression in both directions is about 2:1. However, the degree of compression in either or both directions varies over the area 18. That is, it will in general be lesser over portions of the area intended to appear relatively near to the viewer and greater over portions of the area intended to appear further from the viewer. More generally, the degree or extent of compression (also referred to herein as the "scaling factor") is, at least in general, specific to small portions of the image. This can perhaps more readily be appreciated by an inspection of FIG. 3 of the accompanying drawings, which shows a case in which the input image is mapped on to an area 18' to give an effect equivalent to a perspective view of the input image plane. It will be seen that in this case the horizontal scaling factor (the degree of compression in the horizontal direction) increases in the downward direction.

With regard to rotation, it will be evident that, for example, a portion of the area indicated at 20 in FIG. 2 is subjected to little or no rotation with respect to the corresponding portion of the input picture, whereas a portion indicated at 22 has been rotated by about 45°.

As will now be described in detail, in the absence of corrective measures both compression and rotation of the picture can give rise to aliasing, which will degrade the quality of the output image.

Aliasing due to compression will be considered first. As is known to those skilled in the art, an image can be characterised by a two-dimensional parameter known as spatial frequency, which is proportional to the reciprocal of the angle subtended to the eye of the viewer by the visual spectral components of the image. The concept of spatial frequency can more readily be appreciated by considering an image in the form of a series of uniformly spaced straight lines. For a fixed position of the viewer with respect to such an image, the image has a single spatial frequency which is inversely proportional to the apparent spacing of the lines. (The spatial frequency is horizontal if the lines are vertical lines spaced horizontally, vertical if the lines are horizontal lines spaced vertically, and diagonal in other cases). Clearly, if the image is compressed, so that the lines appear to the viewer to become closer together whereby the angle they subtend to the eye of the viewer decreases, the spatial frequency increases.

The scaling theorem in Fourier analysis states that if an image signal is compressed in the spatial domain, that is if the spatial frequency of the image is increased, then the Fourier transform of the signal increases in the frequency domain (that is, the frequency (in Hz) of the signal increases); and vice versa.

It will be recalled that the image signal discussed above is a sampled signal. Nyquist's Rule concerning the sampling of signals states that, in order not to lose information contained in a signal, the signal must be sampled at a frequency (fs) that is equal to at least twice the bandwidth (fB) of the signal. Naturally, this criterion is complied with when the digital input signal is formed initially by sampling an analog signal. The frequency spectrum (Fourier transform) of the sampled signal in the frequency domain is shown by solid lines in FIG. 4 of the accompanying drawings, which is a graph of amplitude v. frequency (Hz). The frequency spectrum comprises a baseband component 24 (up to fB). Also, the baseband is reflected symmetrically around the sampling frequency fs and its harmonics 2fs, 3fs etc. to produce higher frequency components 26. Provided that Nyquist's Rule is complied with (so that fs/2 is greater than fB) and provided that the signal is band-limited (low-pass filtered) so as to have a cut-off frequency of about fs/2, the higher frequency components 26 will be suppressed.

As explained above, when the sampled signal is subjected to compression in the spatial domain, its Fourier transform exhibits expansion in the frequency domain. Thus, the bandwidths of the components 24, 26 in FIG. 4 increase. As shown by dotted lines in FIG. 4, this can result in aliasing of the signal in that the bandwidth fB of the signal can exceed the Nyquist limit (fs/2) so that part of at least the lowest one of the higher frequency components 26 extends down into and is mixed with the baseband so as to degrade the signal and therefore the image that it represents.

The phenomenon of aliasing due to rotation will now be described. As is known to those skilled in the art, the bandwidth of a system for handling the two-dimensional (vertical/horizontal) sampled image signal can be represented in the spatial domain by a two-dimensional frequency response as represented in FIG. 5 of the accompanying drawings. In FIG. 5, the horizontal axis represents a scale of horizontal spatial frequency in the positive and negative senses (H+ and H−) in units of cycles per picture width, the vertical axis represents a scale of vertical spatial frequency in the positive and negative senses (V+ and V−) in units of cycles per picture height, and the rectangle 28 represents the two-dimensional bandwidth of the system, the vertical and horizontal bandwidths being assumed to be approximately equal. It can be seen from FIG. 5 that diagonal frequencies (e.g. that shown at 30) of values higher than the vertical and horizontal bandwidths will fall within the two-dimensional bandwidth 28. If, for example, the vertical and horizontal bandwidths are equal, then diagonal frequencies of values up to $\sqrt{2}$ times the horizontal/vertical bandwidth fall within the two-dimensional bandwidth 28. However, as will now be explained, this holds true only if the image is not rotated.

FIG. 6 of the accompanying drawings repeats the showing of FIG. 5 and shows also the frequency space 32 of an image which would fall just within the bandwidth 28 (in both dimensions) if the image had not been rotated, but which in fact has been rotated through 45°. As will be seen, the corner regions (shown cross-hatched) of the frequency space 32 fall outside of the bandwidth 28 and therefore may exceed the Nyquist limit (fs/2) in the frequency domain, whereby they are reflected back into the bandwidth 28 (as shown by dotted lines) to mix with the baseband and cause aliasing in a generally similar manner to that explained above for the case of aliasing due to compression.

The extent of aliasing will depend upon the angle of rotation. If the horizontal and vertical bandwidths are the same, it will be appreciated that there is maximum likelihood of aliasing for angles of rotation of 45°, 135°, 225° and 315° and a minimum likelihood of aliasing for angles of rotation of 0°, 90°, 180° and 270°.

Image signal processing apparatus designed to eliminate or reduce aliasing caused by the above-described phenomena is known. UK Patent Specification No GB-B-2 158 322 (Quantel Limited), and corresponding U.S. Pat. No. 4,665,433 (issued May 12, 1987 to Hinson et al), disclose such an apparatus which is designed so as to eliminate or reduce aliasing due to local compression. UK Patent Specification No GB-B-2 183 118 (Sony Corporation) discloses such an apparatus which is designed so as to eliminate or at least reduce aliasing due to local compression and/or rotation of the image. It does this by monitoring the addresses located to successive sets of at least three words or samples (spaced vertically and horizontally) corresponding to successive local areas of the image, computing from the addresses, for each such set of samples, horizontal and vertical local scaling factors representing the extent of compression and/or rotation of the corresponding local area, and varying the horizontal and vertical bandwidth of the signal in accordance with the local scaling factors in a sense to minimize aliasing that otherwise would be caused by compression and/or rotation.

The image signal processing apparatus of GB-B-2 183 118 is shown in FIG. 7 of the accompanying drawings. As can be seen from FIG. 7, the apparatus comprises, like the apparatus of FIG. 1, an input port or terminal 10, a memory 12, an address generator 14 and an output port or terminal 16, and is operative, like the apparatus of FIG. 1, to process a digital input image signal applied to the input port or terminal 10, by mapping it into the memory 12 in response to addresses produced by the address generator 14 in accordance with a mapping function, to produce a manipulated image output signal at the output port or terminal 16. Additionally, however, the apparatus of FIG. 7 includes a variable bandwidth digital filter 40 which is operative to effect two-dimensional filtering of the input signal before it is mapped into the memory 12, a local scaling factor computation means 42 connected to the address generator 14 to compute the local scaling factors from the addresses allocated to successive sets of samples, as just described, and bandwidth control means 44 responsive to the successive computed local scaling factors to vary the bandwidth of the filter 40, as just described, in a sense to minimize aliasing due to local compression and/or rotation of the image. The apparatus includes also a clock signal source (not shown) operative to produce clock pulses at the sample rate fs so as to cause the various illustrated components of the apparatus to perform their respective functions during respective successive clock periods T each equal to 1/fs.

In FIG. 7, as in FIG. 1, the input samples comprise multi-bit words. The bits of each word of the input signal generally will arrive in parallel (at the frequency or rate fs). Also, the bits of words produced internally of the apparatus generally are transferred between the various elements of the apparatus in parallel. Further, bits of each word (sample) of the output signal generally will be generated in parallel. (The same applies to FIGS. 15 to 19 described below). Accordingly, it will be appreciated that items in these figures that are shown or described as lines generally will in fact be in the form of busses or highways.

The principle of operation of the apparatus of FIG. 7 will now be described with reference to FIG. 8 of the accompanying drawings, which is a representation of the samples (words) of the input signal. The samples X01, X02, X03, X04 etc. represent the samples of the first line of the image, the samples X11, X12, X13, X14 etc. represent the samples of the second line of the image, and so on. As explained above, a respective address is generated for each sample by the address generator 14, the address representing the x and y coordinates of a location in the memory 12 in to which the sample is to be mapped. During each clock period, the local scaling factor computation means 42 is operative to compute local scaling factors based upon the addresses allocated to a set of at least three samples corresponding to a local image area. Provided that the set includes two samples that are relatively spaced horizontally and two samples that are relatively spaced vertically (which two groups of two samples may include one sample in common so that a set of only three samples suffices), the words of the set may have any desired predetermined relative disposition. One convenient form of set comprises two adjacent samples in one line and a sample appearing exactly one line after the earlier sample in the first-mentioned line. In this case, the sets of addresses monitored in successive clock periods would be those corresponding to the words X01, X02, X11; X02, X03, X12; X03, X04, X13 ... X11, X12, X21; X12, X13, X22; and so on, as represented, for the first such set, by the dotted line boundary 46 in FIG. 8.

Consider what happens when, for example, the set of samples 46, namely the samples X01, X02, X11, is mapped to locations in the memory 12 represented in FIG. 8 as I1, I2 and I3, respectively. The locations I1, I2 and I3 are represented in FIG. 8 in their relative geometrical orientations in the output image and, as will be evident, the corresponding local image area has been subjected to rotation. It will be assumed also that the local image area has been subjected to compression in both the horizontal and vertical directions and that the extent or degree of compression (scaling factor) for each such direction differs from the other. Assume also that the x, y coordinates of the locations I1, I2 and I3, as indicated by their addresses, are (x1, y1), (x2, y2) and (x3, y3), respectively.

Simple trigonometry shows that the distance between the locations I1 and I2, which correspond to a pair of samples spaced horizontally by 1/fs (one pixel) in the input image, is given by:

$$\sqrt{(x2 - x1)^2 + (y2 - y1)^2} \ .$$

Accordingly, since the distance between the input samples X01, X02 corresponding to the locations I1, I2 is unity (one pixel), the degree of horizontal compression of the local area corresponding to the sample set 46 is given by:

$$\sqrt{(x2 - x1)^2 + (y2 - y1)^2} \ . \qquad (1)$$

Similarly, it can be shown that the degree of vertical compression of the local area corresponding to the sample set 46 is given by:

$$\sqrt{(x3 - x1)^2 + (y3 - y1)^2} \ . \qquad (2)$$

The bandwidth control means 44 is operative on the filter 40 during each clock period to reduce its horizontal and vertical bandwidths (as compared to the values of those bandwidths for the case when the image is not compressed) by the factors given in Equations (1) and (2), respectively, thereby preventing or at least reducing the generation of aliasing due to compression which otherwise would occur in the manner described above with reference to FIG. 4.

However, doing this alone would not prevent (or at least reduce) aliasing caused by rotation, which occurs for the reason explained above with reference to FIGS. 5 and 6. The prevention or reduction of aliasing due to rotation is accomplished as follows. The local scaling factor computation means 42 computes also the extent of rotation of the image. Specifically, it calculates the angle $\theta h$ of the line I1–I2 to the horizontal and the angle $\theta v$ of the line I1–I3 to the vertical, which angles indicate the amounts by which the local area has been rotated with respect to the horizontal and vertical, respectively, and which (in general) may not be the same. In practice, rather than computing $\theta h$ and $\theta v$, it is more convenient to calculate their tangents, since tan $\theta h$ and tan $\theta v$ can be computed easily from the addresses of the points I1, I2 and I3 by the equations:

$$\tan \theta h = \frac{y2 - y1}{x2 - x1}, \quad (3)$$

and $$\tan \theta v = \frac{x3 - x1}{y3 - y1}. \quad (4)$$

Knowledge of the angles $\theta h$ and $\theta v$ (or their tangents) alone is not sufficient to deduce the amount of bandwidth reduction necessary to prevent aliasing due to rotation. As will be recalled from the explanation given above with reference of FIGS. 5 and 6, knowledge also is required of the likelihood of aliasing for the angle concerned. (For example, as indicated above, in the case of substantially equal horizontal and vertical bandwidths the likelihood of aliasing is maximum (and therefor maximum bandwidth reduction is required) if the angle is 45°, 135°, 225° or 315°, whereas the likelihood of aliasing is minimum (and therefore minimum bandwidth reduction is required) if the angle is 0°, 90°, 180° and 270°). It is possible for the local scaling factor computation means 42 to calculate, from the computed values of $\tan \theta h$ and $\tan \theta v$, corresponding values for $F(\theta h)$ and $F(\theta v)$, namely the reductions in the horizontal and vertical bandwidths, respectively, of the filter 40, needed to prevent aliasing due to rotation. Preferably, however, the computation means 42 contains look-up tables of $F(\theta h)$ and $F(\theta v)$ for various values of $\tan \theta h$ and $\tan \theta v$ and is operative to provide values of $F(\theta h)$ and $F(\theta v)$ appropriate to the calculated values of $\tan \theta h$ and $\tan \theta v$ by consulting the look-up tables.

Knowledge of both the compression bandwidth reduction factors as given by Equations (1) and (2) and of the rotation bandwidth reduction factors $F(\theta h)$ and $F(\theta v)$ enables the computation in the local scaling factor computation means 42 of horizontal and vertical scaling factors representing the extent by which the horizontal and vertical bandwidths of the filter 40 must be reduced (with respect to the values of those bandwidths when the image is neither compressed nor rotated) to prevent aliasing due to both compression and rotation. Specifically, the horizontal local scaling factor (horizontal bandwidth reduction factor) HLSF is given by $$HLSF = F(\theta h) \sqrt{(x2 - x1)^2 + (y2 - y1)^2} \quad (5)$$

and the vertical local scaling factor (vertical bandwidth reduction factor) VLSF is given by $$VLSF = F(\theta v) \sqrt{(x3 - x1)^2 + (y3 - y1)^2} \quad (6)$$

Rotation of a local area of an image can be bodily in the sense that the axes of the area remain orthogonal after manipulation. (Thus, in that case, assuming no compression, the manipulated area would, though rotated, be of the same shape as before manipulation). Rotation can instead involve the axes of the area becoming other than orthogonal after manipulation. In other words, the manipulation can result in the area becoming sheared in the sense that an area in the shape of a rectangle would be transformed into a parallelogram.

Consider, for example, the manipulation of a square local area of an image shown in FIG. 9 of the accompanying drawings such that, as shown in FIG. 10, the vertical axis is rotated through 45° and the horizontal axis is not rotated. The grid pattern on FIGS. 9 and 10 illustrates how the area becomes distorted. The area becomes sheared. The shearing of the area causes a horizontal component of the vertical frequency to be added to the horizontal frequency, whereas the vertical frequency remains the same. Thus, it becomes appropriate to consider the question of how much vertical filtering should be effected from the point of view of how the vertical frequency, which becomes diagonal as a result of shearing, affects the horizontal frequency. FIG. 11 of the accompanying drawings shows the area of FIG. 9 sheared in the same sense as in FIG. 10, but to a considerably greater extent. Comparing FIGS. 9 and 11, it will be seen that the spacing between the horizontal lines of the grid pattern, which represents the vertical frequency, is unchanged. But, the spacing between the vertical lines of the grid pattern, which represents the horizontal frequency, is greatly reduced. That is, the horizontal frequency produces a higher frequency in a diagonal direction. There is a need for greater filtering in the horizontal direction because the horizontal component will alias vertically.

GB-B-2 183 118 (cited above) deals with the possibility that manipulation may involve rotation of the axes of a local picture area by respective different angular extents by calculating respective different angles of a manipulated picture area to the horizontal and vertical, respectively, and adjusting local compression factors in accordance with functions of the calculated angles. However, it is believed that the approach adopted in GB-B-2 183 118 may not take full account of the problems resulting from shearing.

OBJECTS AND SUMMARY OF THE INVENTION

An object of the invention is to provide an image signal processing apparatus and/or method enabling optimum minimization of aliasing due to rotation and compression of an image represented by an image signal.

Another object of the invention is to provide an image signal processing apparatus and/or method enabling minimization of aliasing due to rotation (whether or not shearing is involved) and compression of an image represented by an image signal.

A further object of the invention is to provide an image signal processing apparatus and/or method which is generally similar to GB-B-2 183 118 (cited above) in that it minimizes aliasing due to rotation and compression of an image represented by an image signal, but is better able to minimize aliasing where rotation involves shearing (and in particular, but not exclusively, where the shearing involves distortion of a rectangular area into the form of a parallelogram).

Yet another object of the invention is to provide an image signal processing apparatus and/or method which enables optimum minimization of aliasing due to localized rotation (whether or not shearing is involved) and localized compression of an image represented by an image signal.

According to one aspect thereof, the present invention provides an image signal processing apparatus including an address generator for generating addresses for successive words of a digital input signal representing an input image having horizontal and vertical axes to enable the input image to be manipulated to form a manipulated image. A local scaling factor computation means monitors the addresses generated for successive sets of three words of the input signal, each set comprising first and second words that are relatively horizontally spaced in the input image and a third word that is aligned vertically with the second word in the input image, and computes from each such set both horizontal and vertical local scaling factors representing the extent of compression in the horizontal and vertical directions, respectively, of a corresponding local area of the manipulated image. A bandwidth control means is responsive to the successive horizontal and vertical local scaling factors to vary the horizontal and vertical bandwidths of a digital filter of variable horizontal and vertical bandwidths used to effect two-dimensional filtering of the input image in a sense to minimize aliasing that would be caused by the manipulation of the local areas. The local scaling factor computation means is designed to compute the horizontal and vertical local scaling factors for each local area such that the horizontal local scaling factor corresponds to the length of a line that extends perpendicularly from a line passing through the positions of the second and third words in the manipulated image to the position of the first word in the manipulated image and the vertical local scaling factor corresponds to the length of a line that extends perpendicularly from a line passing through the positions of the first and second words in the manipulated image to the position of the third word in the manipulated image.

According to another aspect thereof, the present invention provides an image signal processing method employing the following steps. Addresses are generated for successive words of a digital input signal representing an input image having horizontal and vertical axes to enable the input image to be manipulated to form a manipulated image. The addresses generated for successive sets of three words of the input signal, each set comprising first and second words that are relatively horizontally spaced in the input image and a third word that is aligned vertically with the second word in the input image, are monitored, and both horizontal and vertical local scaling factors representing the extent of compression in the horizontal and vertical directions, respectively, of a corresponding local area of the manipulated image are computed from each such set. Two-dimensional filtering of the input image is carried out by means of a digital filter of variable horizontal and vertical bandwidths. The horizontal and vertical bandwidths of the digital filter are varied in response to the successive horizontal and vertical local scaling factors in a sense to minimize aliasing that would be caused by the manipulation of the local areas. To provide optimum aliasing minimization, the computation of the horizontal and vertical local scaling factors for each local area comprises computing them such that the horizontal local scaling factor corresponds to the length of a line that extends perpendicularly from a line passing through the positions of the second and third words in the manipulated image to the position of the first word in the manipulated image and the vertical local scaling factor corresponds to the length of a line that extends perpendicularly from a line passing through the positions of the first and second words in the manipulated image to the position of the third word in the manipulated image.

As will be explained below, the horizontal and vertical frequencies in the manipulated image areas (whether the manipulation involves rotation, with or without shearing, and/or compression) have the highest magnitudes in the directions of the above-mentioned respective lines, whereby using the lengths of these lines to determine the extent of horizontal and vertical filtering, respectively, affords a good and readily implementable approach to optimizing the prevention of aliasing due to rotation (whether or not shearing is involved) and compression.

The apparatus and method not only minimize aliasing due to rotation and/or compression, but take account of the fact that the degree or extent of rotation and/or compression can vary over the manipulated image and match the filtering (specifically, the horizontal and vertical bandwidths of the filter) optimally to that required for each local area of the image. Further, by virtue of the fact that local scaling factors are computed from the addresses used for mapping, the apparatus will operate regardless of the particular mapping function that is employed.

BRIEF DESCRIPTION OF THE DRAWINGS

The above and other objects, features and advantages of the invention will be apparent from the followed detailed description of illustrative embodiments thereof, which is to be read in conjunction with the accompanying drawings, in which like references indicate like items throughout, and in which.

DESCRIPTION OF THE PREFERRED EMBODIMENTS

Figure 12:
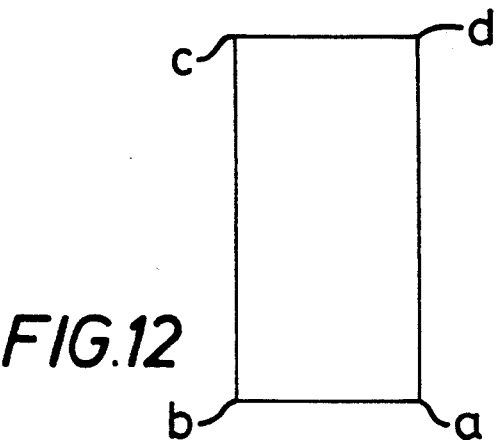
FIG. 12 shows a rectangular local area of an image prior to manipulation.

FIG. 12 shows a local area of an image or picture, represented by a digital signal, prior to manipulation by mapping, for example generally as described above with reference to FIG. 7. The area may be a single pixel or a "tile" constituted by an array or block of pixels. (It could in fact be a whole image or picture). Prior to manipulation, the area is rectangular. For instance, it could be a field pixel (a picture element of a field, as opposed to a frame) of a video signal. The area has corners a, b, c and d. Its edges c-d and b-a are horizontal and its edges c-b and d-a are vertical.

Figure 13:
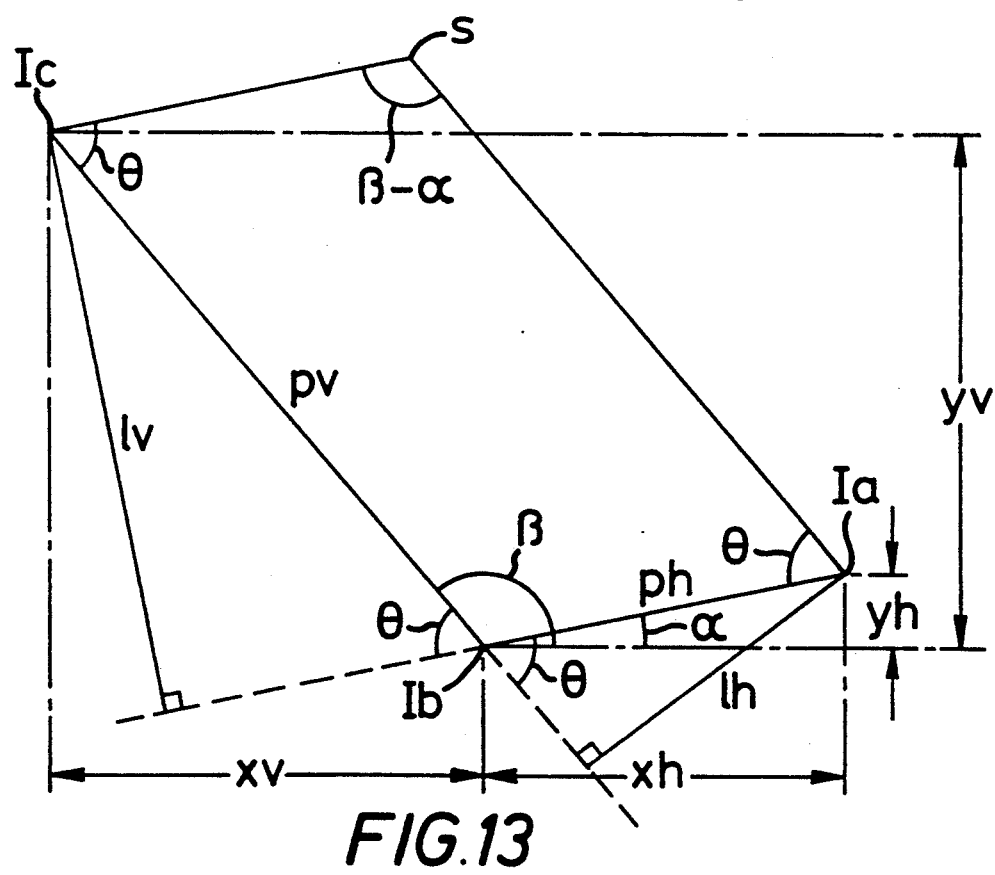
FIG. 13 shows the area of FIG. 12 after manipulation and indicates horizontal and vertical local scaling factors that are calculated in a local scaling factor computation means used in embodiments of the invention.

FIG. 13 shows the area of FIG. 12 after manipulation. The positions of the corners a, b and c after manipulation, that is their positions in the manipulated image, are represented in FIG. 13 as Ia, Ib and Ic, respectively. The manipulation has resulted in the area being compressed and rotated. The rotation has involved shearing of the area in that the axes of the manipulated area are skewed by an angle θ which is not equal to 90°. The mapped horizontal Ib-Ia, namely the edge b-a after manipulation, is of length ph and is inclined to the horizontal by an angle α and the mapped vertical Ic-Ib, namely the edge c-b after manipulation, is of length pv and is inclined to the vertical by an angle β−90°.

The position Ib is spaced horizontally from the position Ic by a distance xv. The position Ia is spaced horizontally from the position Ib by a distance xh. The position Ib is spaced vertically from the position Ic by a distance yv. The position Ia is spaced vertically from the position Ib by a distance yh.

In FIG. 13, the positions Ia and Ic are shown joined to a position S by lines parallel to the mapped horizontal ph and mapped vertical pv so as to define a parallelogram Ic-Ib-Ia-S whose internal angles are as represented in FIG. 13. If, which is not necessarily the case, the manipulation of the area of FIG. 12 consisted of transforming it into a parallelogram, the point S would be coincident with the position in the manipulated image of the corner d in the unmanipulated image. It is assumed for present purposes that the manipulation of the area of FIG. 12 does in fact consist of transforming it into the parallelogram Ic-Ib-Ia-S of FIG. 13.

A line of length lh extends perpendicularly from a line passing through the positions Ib and Ic to the position Ia. The direction of this line represents the direction in which the horizontal frequencies in the manipulated image area (the parallelogram Ic-Ib-Ia-S) have the highest magnitudes. Similarly, a line of length lv extends perpendicularly from a line passing through the positions Ib and Ia to the position Ic. The direction of this line represents the direction in which the vertical frequencies in the manipulated image area have the highest magnitudes. Accordingly, in embodiments of the invention described below, the lengths lh and lv of these lines are calculated and horizontal and vertical local scaling factors corresponding thereto are used to control horizontal and vertical bandwidths of a filter in like manner to that described above with reference to FIG. 7. Specifically, the horizontal bandwidth of the filter is reduced (with respect to its value for zero manipulation) by the ratio of the length lh to the length of the horizontal edge b-a of the unmanipulated area as shown in FIG. 12, and the vertical bandwidth of the filter is reduced (with respect to its value for zero manipulation) by the ratio of the length lv to the length of the vertical edge c-b. This minimizes aliasing caused by the manipulation, regardless of the nature of the manipulation, provided that the manipulated area is at least approximately in the form of a parallelogram. (In this regard, the amount of image compression within a parallelogram is constant).

A first apparatus embodying the invention will now be described. The apparatus is of the same construction as the known apparatus shown in FIG. 7, except that the local scaling factor computation means 42 is operative as just described to calculate horizontal and vertical local scaling factors corresponding to the lengths lh and lv, respectively.

Figure 1:
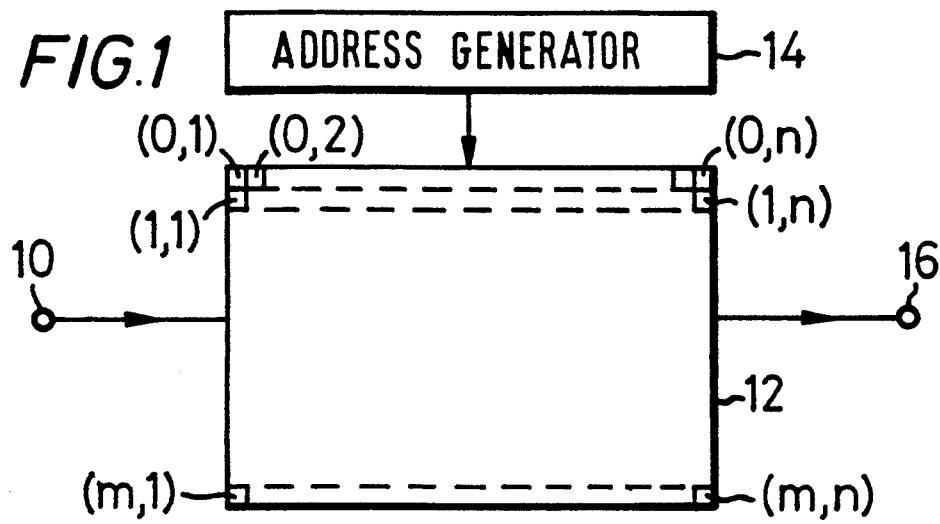
FIGS. 1 to 3 are schematic views of an image signal processing apparatus for mapping a digital image signal into a memory so that the image can be manipulated in the spatial domain, FIG. 1 showing a case in which the image is not manipulated and FIGS. 2 and 3 showing respective different forms of mapping/manipulation.
Figure 2:
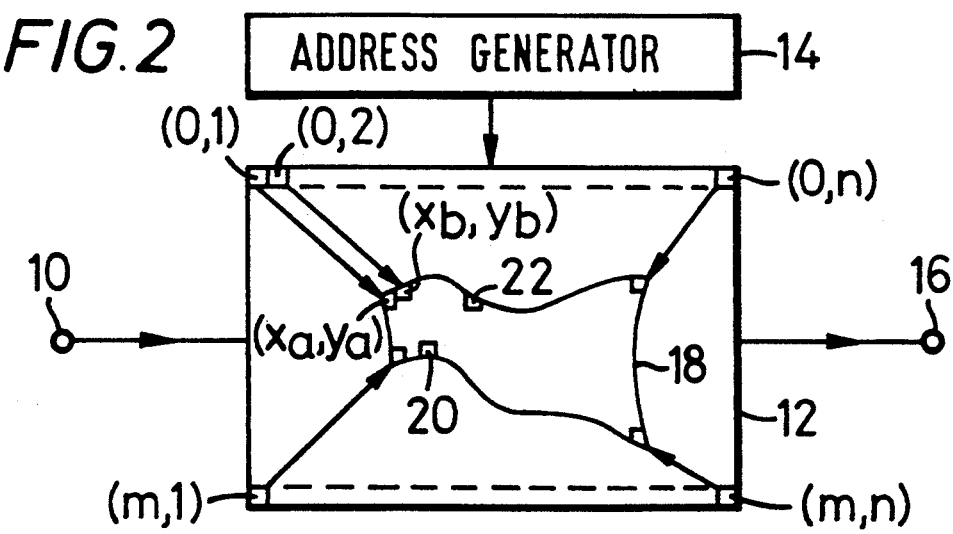
Figure 3:
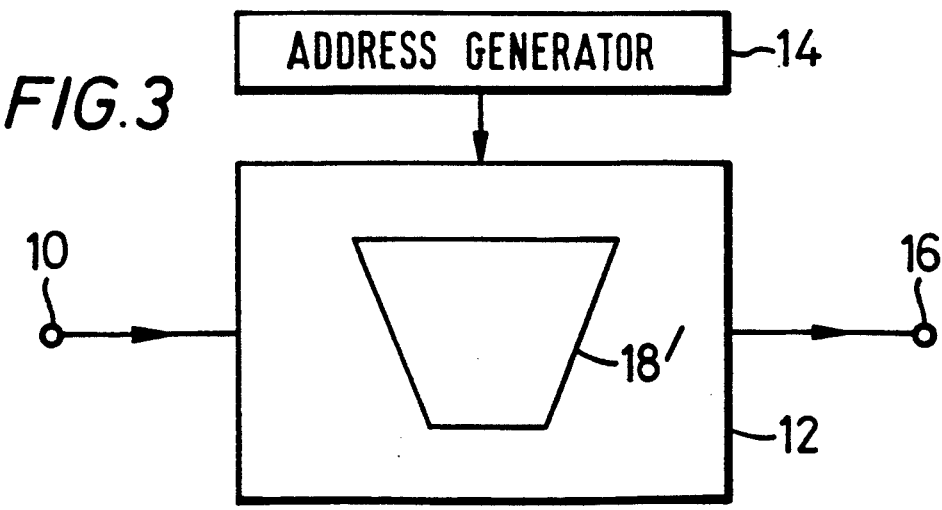
Figure 4:
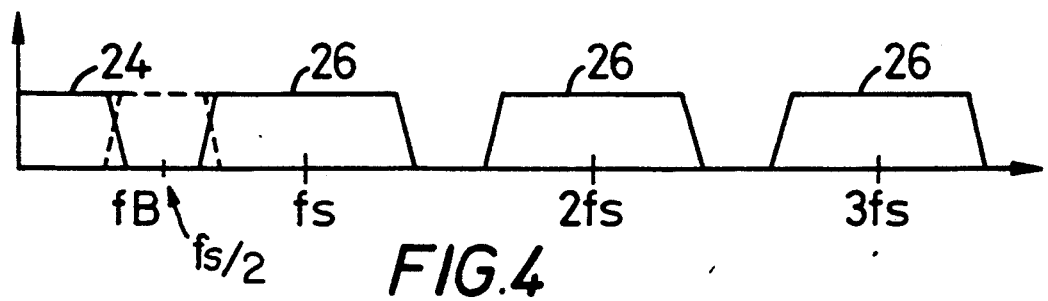
FIG. 4 shows the frequency response of a sampled image signal in the frequency domain, that is it is a graph of amplitude v. frequency (Hz), and shows how image compression can cause aliasing.
Figure 5:
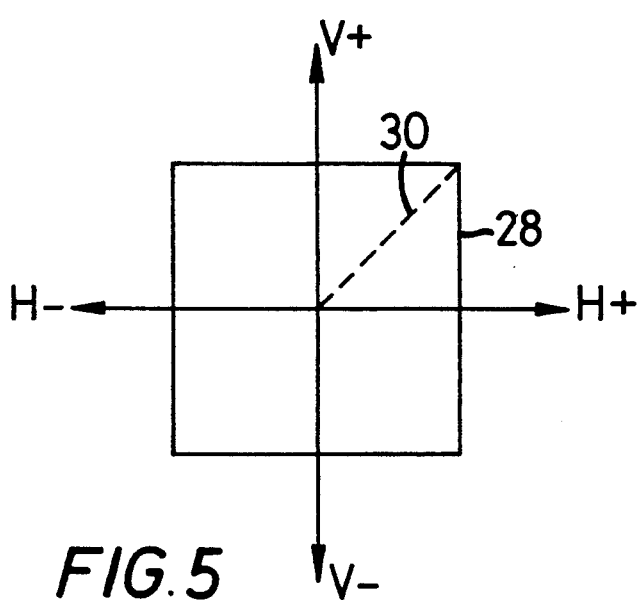
FIG. 5 shows the two-dimensional bandwidth in the spatial domain of a system for handling an image signal.
Figure 6:
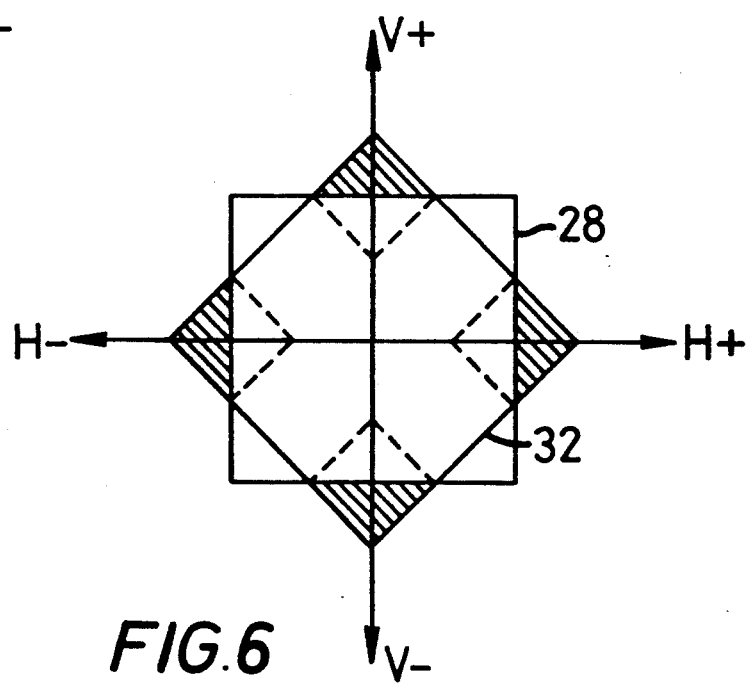
FIG. 6 repeats the showing of FIG. 5, but shows how rotation of the image can cause aliasing.
Figure 7:
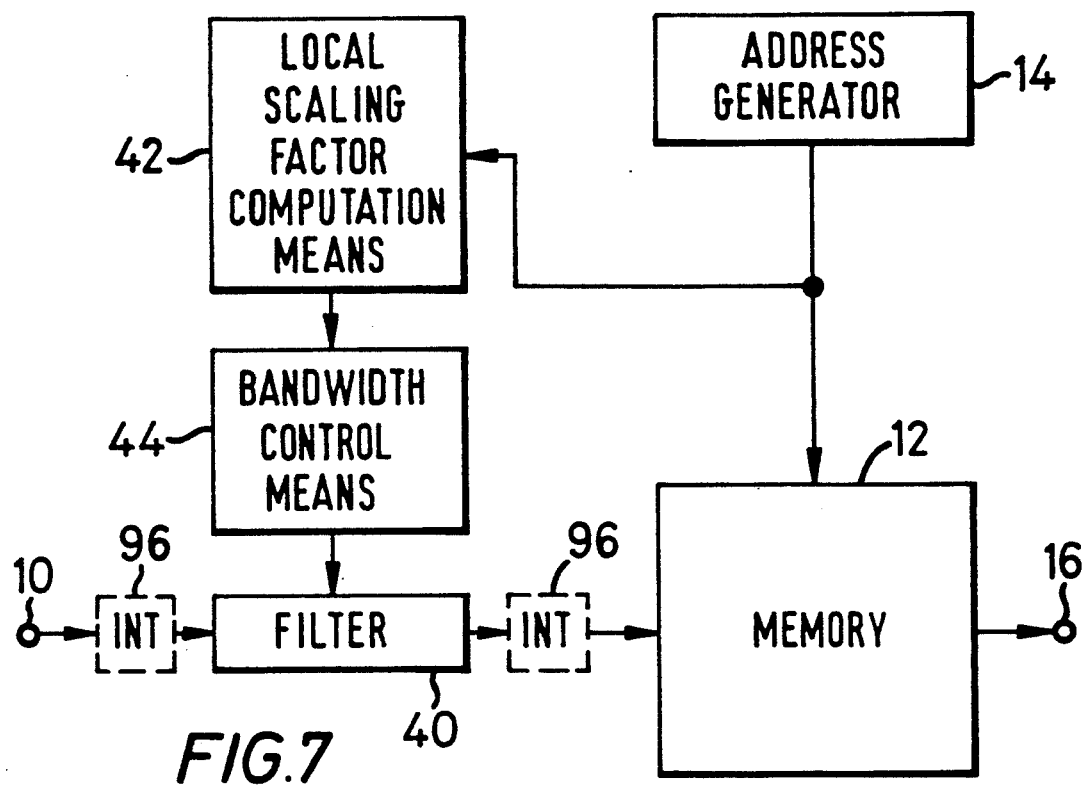
FIG. 7 is a block schematic diagram of an image signal processing apparatus disclosed in GB-B-2 183 118 (cited above)
Figure 8:
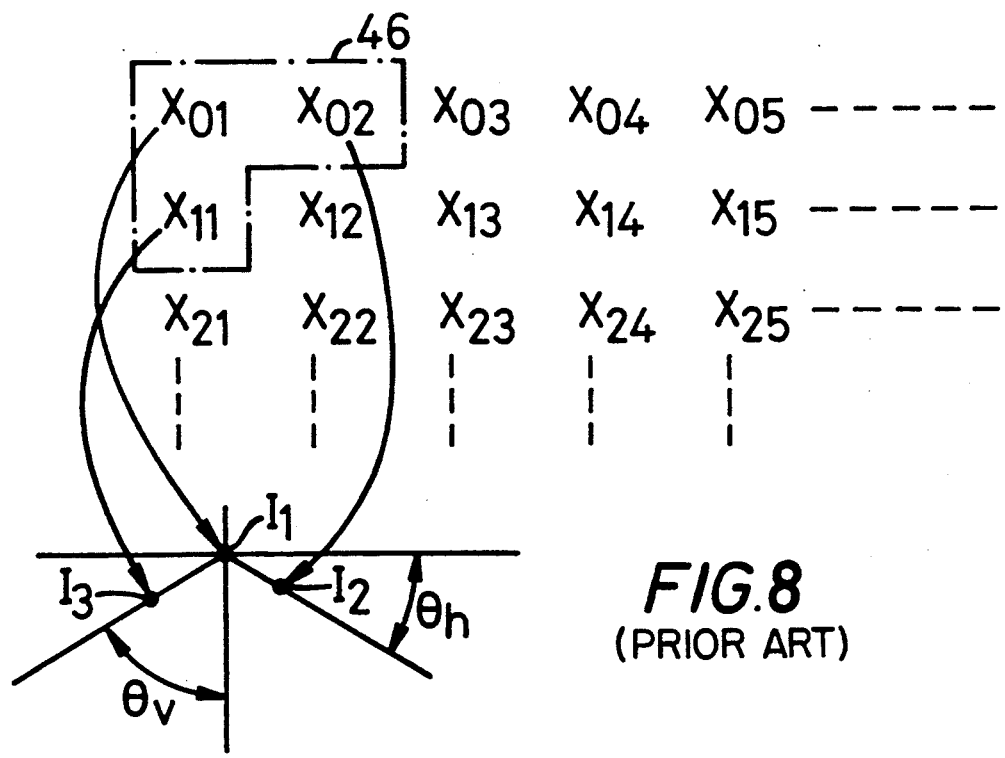
FIG. 8 is a diagram used for explaining the operations performed in a local scaling factor computation means of the apparatus of GB-B-2 183 118 as shown in FIG. 7.
Figure 9:
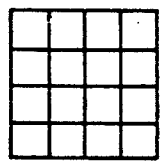
FIG. 9 shows a square local area of an image prior to manipulation.
Figure 10:
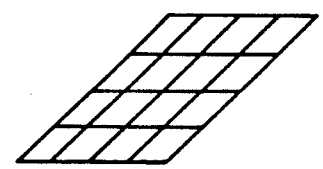
FIG. 10 shows the area of FIG. 9 after manipulation comprising shearing such that the vertical axis is rotated through 45° and the horizontal axis is not rotated.
Figure 11:
FIG. 11 shows the area of FIG. 9 sheared in the same sense as in FIG. 10, but to a considerably greater extent.
Figure 14:
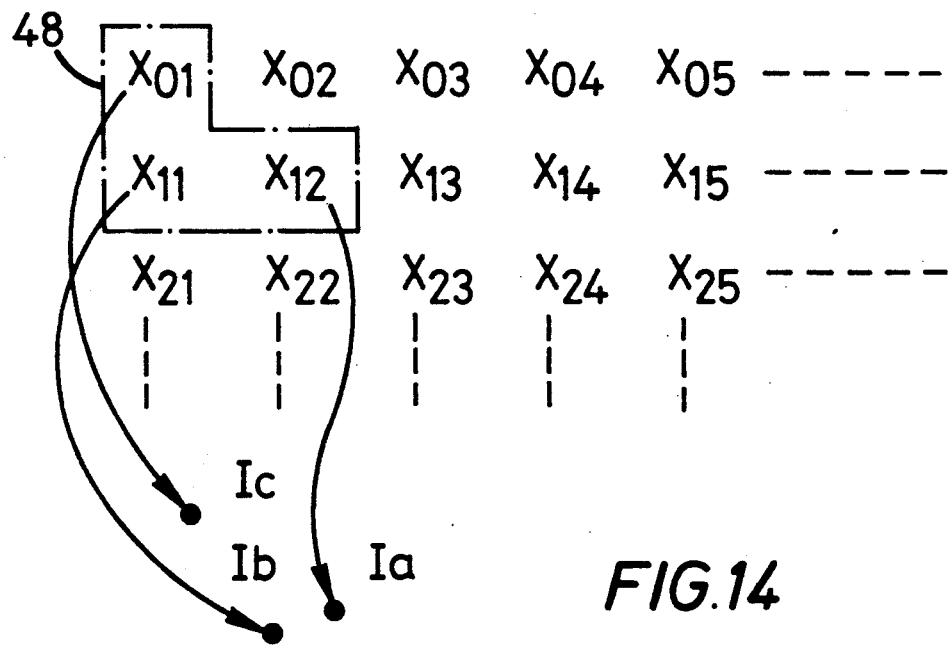
FIG. 14 is a diagram used for explaining operations performed in the local scaling factor computation means used in embodiments of the invention.

FIG. 14 is a representation, very similar to that of FIG. 8, of the samples (words) of the input signal applied to the terminal 10 in FIG. 7. As in FIG. 8, the samples X01, X02, X03, X04 etc, are of the first line of the image, the samples X11, X12, X13, X14 etc. are of the second line of the image, and so on. A respective address is generated for each sample by the address generator 14, the address representing the x and y coordinates of a location in the memory 12 into which the sample is to be mapped. During each clock period, the local scaling factor computation means 42 is operative to compute the local scaling factor corresponding to the lengths lh and lv from a set of addresses allocated to a set of three of the samples corresponding, in this case, to a single pixel sized local area of the image represented by the input signal. The set of samples comprises first and second samples which are horizontally adjacent (that is, which are adjacent to one another in the same line) and a third sample which is vertically aligned with the second sample. Specifically, the sets of addresses monitored in successive clock periods may, for conformity with FIG. 13, be those corresponding to the words X01, X11, X12; X02, X12, X13; X03, X13, X14 ... X11, X21, X22; and so on, as represented, for the first such set, by the dotted line boundary 48 in FIG. 14. As can be seen from FIGS. 13 and 14, each such set of samples represents the corners c, b and a of a one pixel sized local image area and, after manipulation of the area, they occupy the positions Ic, Ib and Ia in FIG. 13.

Ways in which the lengths lh and lv can be calculated by the local scaling factor computation means 42 will now be described. The local scaling factor computation means 42 uses the address differences in the x and y coordinate directions to calculate the distances xh, xv, yh and yv (FIG. 13). To this end, the local scaling factor computation means 42 may comprise a first computation section 50 shown in FIG. 15. As shown in FIG.

15, during each clock period T (=1/fs) the x component of the current address is fed to a subtractor 52, both directly and via a one sample delay element 54, and to a subtractor 56, both directly and via a one line delay element 58. It will readily be seen by comparing FIGS. 13 and 15 that, during each clock period, the subtractors 52 and 56 output values for xh and xv, respectively. Similarly, during each clock period the y component of the current address is fed to an subtractor 60, both directly and via a one sample delay element 62, and to a subtractor 64, both directly and via a one line delay element 66. It will readily be seen by comparing FIGS. 13 and 15 that, during each clock period, the subractors 60 and 64 output values for yh and yv, respectively.

The one sample delay elements 54 and 62 may comprise latches that introduce a delay (T=1/fs) equal to one sample and the one line delay elements 58 and 66 may comprise a series of latches that produce a delay (n.T=n/fs) equal to the number n of samples per line of the image.

The values for xh, xv, yh and yv produced by the first computation section 50 can be used to calculate values for the lengths lh and lv as follows.

Referring to FIG. 13, simple trigonometry shows that the following equations hold true:

$$\tan \alpha = yh/xh$$
$$\tan \beta = yv/-xv$$
$$\theta = 180° - (\beta - \alpha)$$
$$lh = ph \cdot \sin \theta$$
$$= ph \cdot \sin(\beta - \alpha)$$
$$= ph \cdot (\sin\beta \cdot \cos\alpha - \cos\beta \cdot \sin\alpha)$$
$$= ph \cdot \left[ \frac{yv}{pv} \cdot \frac{xh}{ph} - \frac{xv}{pv} \cdot \frac{yh}{ph} \right]$$
$$= \frac{yv \cdot xh - xv \cdot yh}{pv}$$

$$lh = \frac{yv \cdot xh - xv \cdot yh}{(yv^2 + xv^2)^{\frac{1}{2}}} \quad (1)$$

Similarly, it can be shown that:

$$lv = \frac{xv \cdot yh - yv \cdot xh}{ph} \quad (2)$$
$$= \frac{xv \cdot yh - yv \cdot xh}{(yh^2 + xh^2)^{\frac{1}{2}}}$$

A second computation section of the local scaling factor computation means 42 calculates values for lh and lv using the above equations.

Figure 16:
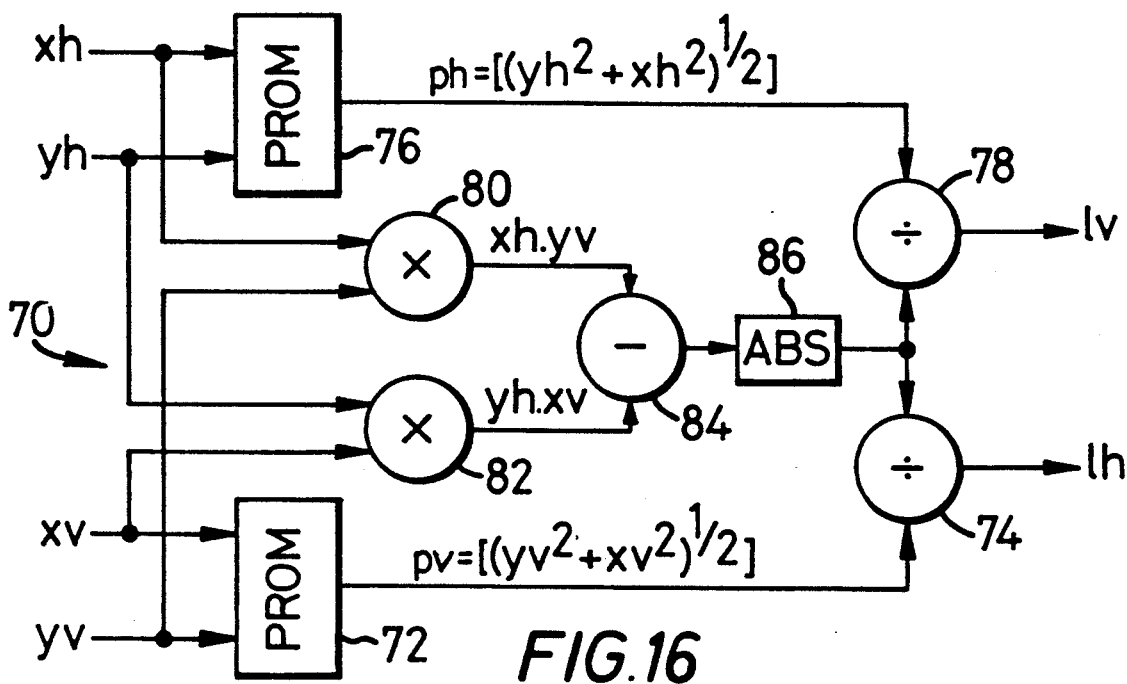
FIG. 16 is a block schematic diagram of a second computation section of the local scaling factor computation means used in embodiments of the invention.

A first form of implementing the second computation section of the local scaling factor computation means 42 is shown at 70 in FIG. 16. The values of xv and yv produced by the first computation section 50 of the local scaling factor computation means 42 are supplied to a programmable read only memory (PROM) 72 which is programmed with the solution of the root of the sum of squares relationship forming the denominator of Equation (1) above for different combinations of values of xv and yv. Consequently, the PROM 72 produces a value for pv, the denominator of Equation (1), which is passed to one input of a divider 74. Similarly, the values of xh and yh produced by the first computation section 50 of the local scaling factor computation means 42 are supplied to a PROM 76 which is programmed with the solution of the root of the sum of squares relationship forming the denominator of Equation (2) above for different combinations of values of xh and yh. Consequently, the PROM 76 produces a value for ph, the denominator of Equation (2), which is passed to one input of a divider 78.

It will be seen from a comparison of Equations (1) and (2) above that, except for being of opposite sign, their numerators are the same. They can therefore be derived by common hardware. Specifically, as shown in FIG. 16, the terms xh.yv and yh.xv are formed in multipliers 80 and 82, respectively, subtracted from one another in a subtractor 84, and the result of the subtraction operation is passed through a circuit 86 which produces its absolute value (that is, turns a negative result into a positive result and leaves a positive result alone). The absolute value is supplied to other inputs of the dividers 74 and 78 in which it is divided by the values supplied to their other inputs to produce values for lh and lv by solving Equations (1) and (2) above.

Figure 15:
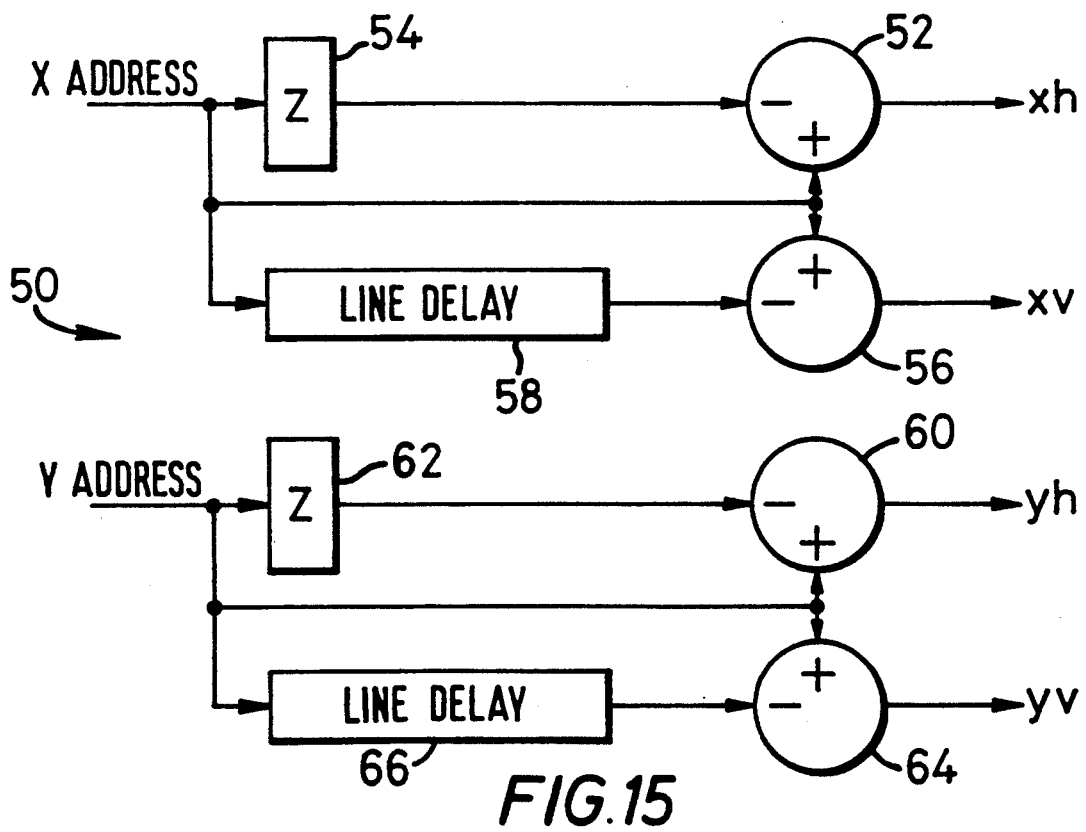
FIG. 15 is a block schematic diagram of a first computation section of the local scaling factor computation means used in embodiments of the invention.
Figure 17:
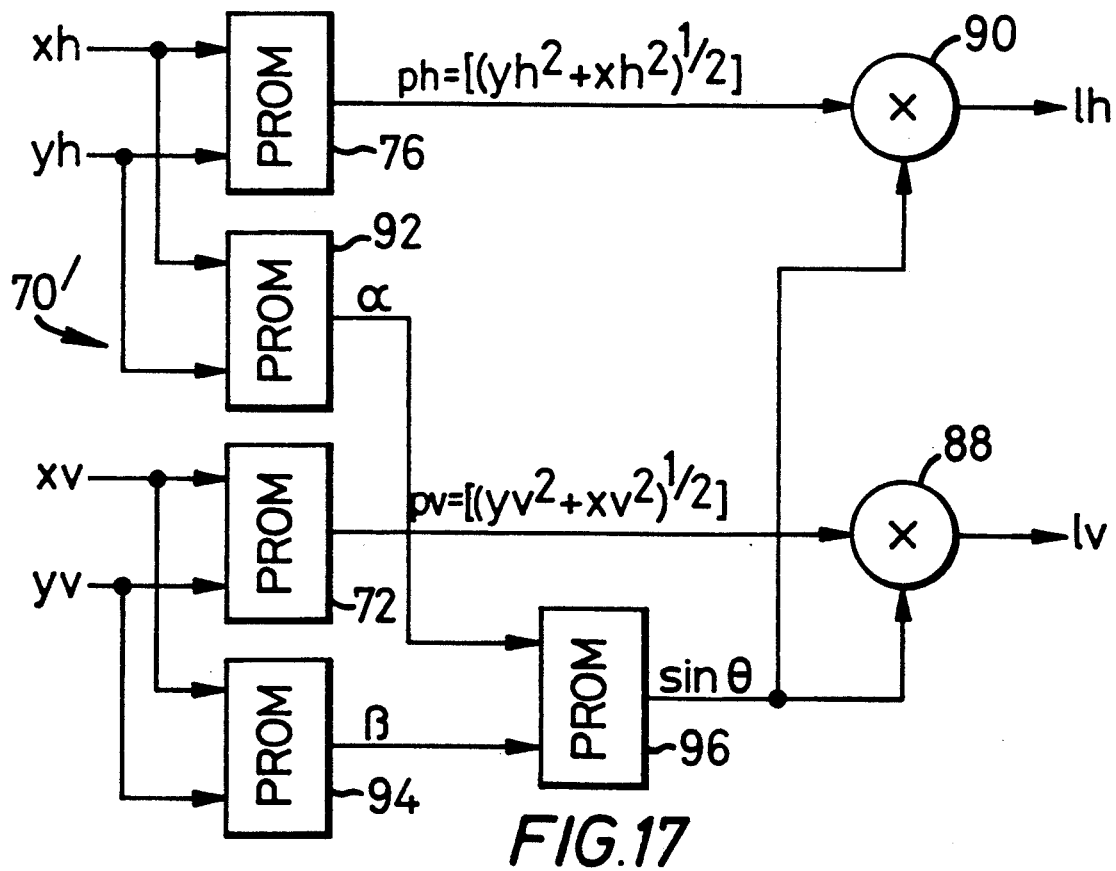
FIG. 17 is a block schematic diagram of an alternative form of implementation of the second computation section.

A second form of implementing the second computation section of the local scaling factor computation means 42 is shown at 70' in FIG. 17. As in FIG. 16, values of pv and ph are formed in PROMs 72 and 76. The values of pv and ph are passed to inputs of respective multipliers 88 and 90. A PROM 92 produces a value for $\alpha$ from the values of xh and yh outputted by the first computation section 50 (FIG. 15). Likewise, a PROM 94 produces a value for $\beta$ from the values of xv and yv outputted by the first computation section 50. A further PROM 96 receives the values of $\alpha$ and $\beta$ from the PROMs 92 and 94 and produces a value for sin $\theta$ which is passed to other inputs of the multipliers 88 and 90 whereby the multipliers produce values for lh and lv in accordance with the relationships lh=ph.sin $\theta$ and lv=pv.sin $\theta$.

Thus, for each clock period T, the local scaling factor computation means 42 outputs values of lh and lv appropriate to a successive respective local image area corresponding to a set of three samples in the manner described generally above. As described above, the values of lh and lv are supplied to the bandwidth control means 44 to control the vertical and horizontal bandwidths of the two-dimensional filter 40. Naturally, there is propagation delay through the local scaling factor computation means 42 and also through the filter 40. It may therefore be necessary to incorporate a compensating delay somewhere in the apparatus to ensure the correct temporal relationship between the dynamic control of the filter bandwidth and the signal being filtered.

Figure 18:
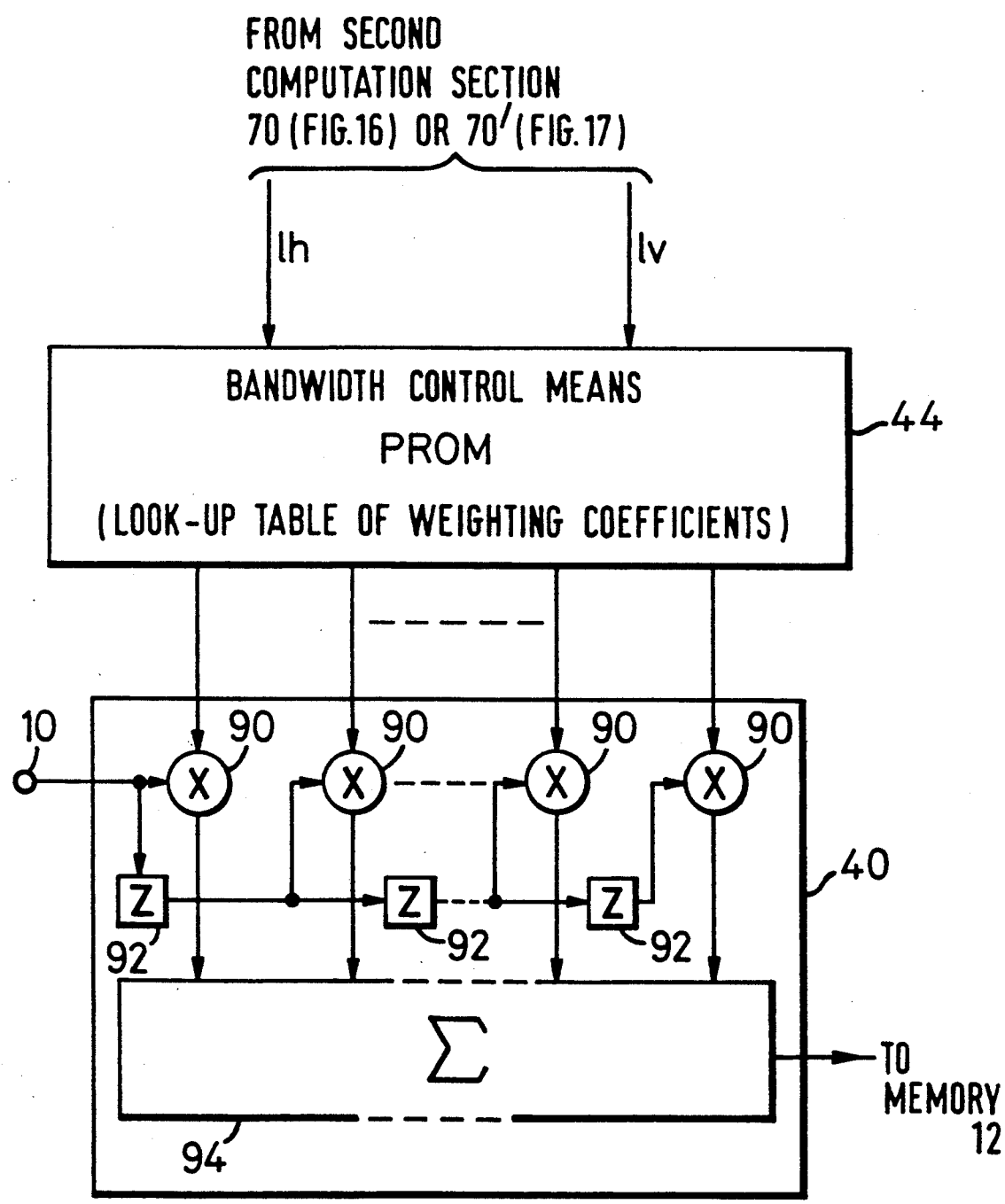
FIG. 18 is a block schematic diagram of a bandwidth control means and a variable bandwidth two-dimensional filter of the apparatus of FIG. 7.

The bandwidth control means 44 and the two-dimensional (2D) filter 40 will now be described in more detail with reference to FIG. 18. The filter 40 can be of any suitable type. Preferably, however, a finite impulse response (FIR) type of filter is employed. The design of 2D FIR filters is known per se and therefore the preferred form of filter will not be described in great detail. As is known to those skilled in the art, a 2D-FIR filter is operative during each clock period T (=1/fs) to calculate a filtered output word or sample by multiplying a predetermined set of vertically and horizontally spaced samples of the input signal by respective weighting coefficients and summing the products of the multiplication operations. To this end, a 2D FIR filter generally will comprise a plurality of multipliers supplied with respective weighting coefficients, a plurality of one sample delay elements and one line delay elements (line stores) arranged upstream or downstream of the multipliers to delay the samples of the input signal by different amounts to form the predetermined set of vertically and horizontally spaced samples, and a summing means to sum the delayed, weighted products. Since the filter 40 can be of a variety of configurations, it has been represented in a rather general and simplified form in FIG. 18 as comprising a plurality of multipliers 90, a plurality of delay elements 92 and a summing means 94. Respective different weighting coefficients are supplied to the multipliers 90 on lines extending from the bandwidth control means 44.

As is known to those skilled in the art, the vertical and horizontal bandwidths of a 2D FIR filter of a particular configuration depend upon the values chosen for the weighting coefficients. That is to say, the vertical and horizontal bandwidths of the filter 40 may be varied simply by varying the values of the weighting coefficients. To this end, the bandwidth control means 44 may be responsive to the values of the horizontal and vertical local scaling factors lh and lv to compute appropriate values for the weighting coefficients to achieve a reduction in horizontal and vertical bandwidth of the filter 40 appropriate to the values of lh and lv. Preferably, however, a range of sets of weighting coefficient values appropriate to all possible values of lh and lv is computed at the design stage and the bandwidth control means 44 is implemented in the form of PROM that stores a lookup table of the pre-computed sets of weighting coefficient values and outputs appropriate values of the weighting coefficients to the filter 40 at each clock period in accordance with the values of lh and lv received from the local scaling factor computation means 42.

As explained above, the required reductions in horizontal and vertical bandwidths are equal to the ratios of lh and lv to the horizontal and vertical dimensions (lengths of the edges of b-a and c-b), respectively, of the unmanipulated image area. These two dimensions are taken into account in the design of the look-up table in the bandwidth control means 44, whereby the values lh and lv (rather than ratios computed therefrom) can be supplied directly to the bandwidth control means as the horizontal and vertical local scaling factors.

It was explained above with reference to FIG. 14 that, for example, the set of samples 48, namely the samples X01, X11, X12, is mapped to locations or positions in the memory 12 represented in FIGS. 13 and 14 as Ic, Ib and Ia, respectively. Due to compression and/or rotation, the locations Ic, Ib and Ia may not correspond to exact pixel sites (discrete raster or array positions spaced by 1/fs) of the output image signal or output array. In practice, in the case of generation of digital video effects it is generally desirable that the locations in the memory 12 into which the words of the input signal are mapped should in fact correspond to exact pixel sites, since it is generally required that the output array should correspond to the input array.

One way of accomplishing this would be for the address generator 14 to generate, for each word of the input signal, an address representing the pixel site (memory position) that is closest to the position into which the mapping function indicates that the input word should be mapped. The input word therefore is mapped into that pixel site. Obviously, while this approach may be satisfactory, it would give rise to inaccuracy. An alternative approach would be for the address generator 14 to generate, for each word of the input signal, an address that indicates precisely (without restriction to exact pixel sites) the position into which the mapping function indicates that the word should be mapped. That address is passed to the local scaling factor computation means 42 for processing in the manner described above. The address comprises a major address portion representing the x and y coordinates of the pixel site that is closest to the position into which the mapping function indicates that the input word should be mapped, and a residual address portion representing the difference between the x and y coordinates of that pixel site and that position. Of these, only the major address position is supplied to the memory 12. Consequently, in this case also the input word is mapped into the closest pixel site. While this approach also may be satisfactory, it also will give rise to inaccuracy.

The above-mentioned inaccuracy can be overcome (or at least reduced) by adopting the following approach. As in the second of the approaches just mentioned above, the full address is applied to the local scaling factor computation means 42 and the major address portion only is supplied to the memory 12. Additionally, however, the residual address portion is applied to interpolation means 96, shown in phantom in FIG. 7, which, as shown, is positioned either before the filter 40 or between the filter 40 and the memory 12. The interpolation means is responsive to the value of the position increment from the closest pixel site, as represented by the residual address portion, to interpolate between the values of available input samples or words to produce, for each input sample or word, an interpolated sample or word which corresponds to that point in the input image which, using the mapping function, would map exactly on to the selected closest pixel site. That interpolated sample or word, rather than the input sample or word, is sent to the memory 12 for storage in the selected pixel site. Thus, in contrast to the previous approaches described above, a precise desired relationship (as dictated by the mapping function) is maintained between the different positions of the memory 12 and the positions in the input image of the samples stored therein. An interpolation technique as just set forth is described in UK Patent Application Publication No. GB-A-2 172 167 (Sony Corporation).

As will be appreciated, the above-described image processing apparatus embodying the invention can be considered as incorporating a filter that is adaptive in the sense that its vertical and horizontal bandwidths are adapted continuously in accordance with the extent and nature of compression and rotation of local areas of the mapped image in a sense to prevent or minimize aliasing. This can lead to the production of high quality visual effects in that the filtering is matched optimally to that required at each point in the image. The preferred implementation of the apparatus can lead to very compact hardware implementation and allows commonality of hardware between vertical and horizontal filtering requirements. The apparatus functions by operating directly on the addresses as they are calculated by the address generator 14, so that the apparatus will operate regardless of the mapping function being used.

Some other ways of embodying the invention will now be described.

Figure 19:
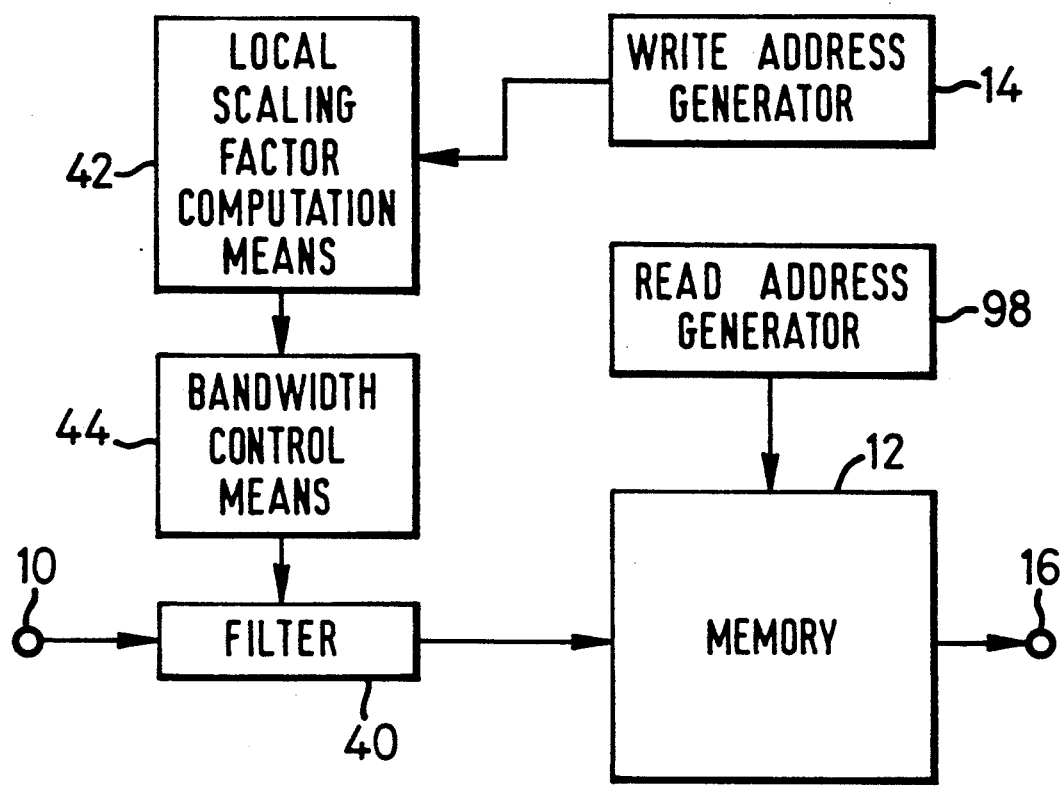
FIG. 19 shows a modified version of the apparatus of FIG. 7 in which the invention can be embodied.

The invention can be embodied in a modified form of the apparatus of FIG. 7 as represented in FIG. 19. The apparatus of FIG. 19 is the same as that of FIG. 7 except as follows.

Firstly, the address generator 14, now also referred to as a write address generator, is not connected to the memory 12. Consequently, the digital input image signal applied to the terminal 10 is not mapped into the memory 12, but, instead, is written into the memory in a non-manipulated form. However, the addresses from the write address generator 14, which indicate how the image represented by the input signal is to be manipulated, are supplied (as before) to the local scaling factor computation means 42 whereby (as before) the words of the signal are filtered by the filter 40, prior to being written into the memory 12, in accordance with the manipulation (as indicated by the addresses) to which they are to be subjected.

Secondly, a read address generator 98 is connected to the memory 12 to supply thereto addresses controlling reading of the words or samples of the signal from the memory. The addresses generated by the read address generator 98 correspond to those generated by the write address generator 14, but with the manipulation inverted, as a result of which the desired manipulation of the image is accomplished as the words representing the image (already filtered in accordance with the manipulation to be effected) are read from the memory. In order that the read addresses generated by the read address generator 98 will conform to the addresses (generated by the write address generator 14) used to write to the memory 12, a delay of one frame or field (as appropriate) is needed between reading and writing.

The foregoing description is largely concerned only with the case in which the horizontal and vertical local scaling factors are generated for every pixel, that is for local image areas each of single pixel size. It was, however, indicated in the foregoing description of FIG. 12 that the local area could in fact be a "tile" constituted by an array or block of pixels. A way in which the above-described apparatus embodying the invention can be modified to function in this case, that is to produce horizontal and vertical local scaling factors for each of a plurality of tessellating tiles of the image, rather than for each pixel thereof, will now be described.

Assume that the tile is a rectangular array of U×V pixels, that is an array having a horizontal extent of U samples and a vertical extent of V (scanning) lines. The first computation section 50 (FIG. 15) of the local scaling factor computation means 42 is modified in that the delay elements 54 and 62 each produce a delay of U samples (rather than one sample) and the delay elements 58 and 66 each produce a delay of V lines (rather than one line). Thus, the sample addresses applied to the adders 52 and 60 are horizontally spaced by U samples (rather than being adjacent) and the sample addresses applied to the adders 56 and 64 are vertically spaced by V samples (rather than being adjacent). Also, instead of being clocked at the sampling rate fs, the first computation section 50 (and, indeed, the whole of the local scaling factor computation means 42 and also the bandwidth control means 44) is clocked at a reduced rate of fs/U.V. The horizontal and vertical local scaling factors produced for each respective tile at the reduced rate are used for the whole of the relevant title. (It will be appreciated that since the scaling factors for each tile cannot be calculated until the address for the last sample in the tile has been received by the local scaling factor computation means 42, the samples as processed by the filter 40 must be delayed by an appropriate amount to ensure that the scaling factors supplied to the bandwidth control means 44 correspond to the relevant tile).

As before, the local scaling factor computation means 42 monitors the addresses generated by the address generator 14 for successive sets of three words of the input signal, and computes the values lh and lv therefrom in the manner described above. However, in this case the three words are spaced apart from one another by a greater extent and the addresses corresponding to the three words represent a correspondingly greater local area (a tile) of the image. Further, each pair of horizontal and vertical local scaling factors is used over the whole of the associated tile. The reduced rate of computing the scaling factors significantly reduces the computational demands on the apparatus.

It was explained above that it was assumed that the manipulation of each local area (generally rectangular) of the image consists in transforming the area into a parallelogram. The accuracy to which filtering is controlled by the computed values lh and lv depends upon the extent to which that assumption is correct. It is possible that some mapping functions will result in some of the local areas being transformed into quadrilaterals which depart considerably in shape from that of a parallelogram, as a consequence of which the inaccuracy in calculating lh and lv on the assumption that the manipulated areas are parallelograms could result in those areas being filtered less than optimally whereby the areas may display some aliasing or may be over-filtered. The extent to which such departure is of significance will depend on a number of factors. For example, if in creation of a digital video effect some of the local areas are filtered less than optimally whereby those areas display some aliasing or are over-filtered, the results may hardly be subjectively noticeable whereby the inaccuracy is acceptable. Further, the subjective noticeability of non-optimal filtering is likely to increase with the size of the local area and may only reach an unacceptable level in the case of areas of a reasonably large size, since the present technique results in the extent of the inaccuracy, in the case of a manipulated area departing substantially from the shape of a parallelogram, varying as between different places in the area. Specifically, the computed scaling factors will be accurate for one corner of the area and become progressively less accurate at positions in the area further away from that corner. However, in cases where non-optimal filtering due to the shapes of some manipulated areas departing substantially from the shape of a parallelogram is regarded as being subjectively unacceptable, the invention can be embodied in the modified manner that will now be described.

Figure 20:
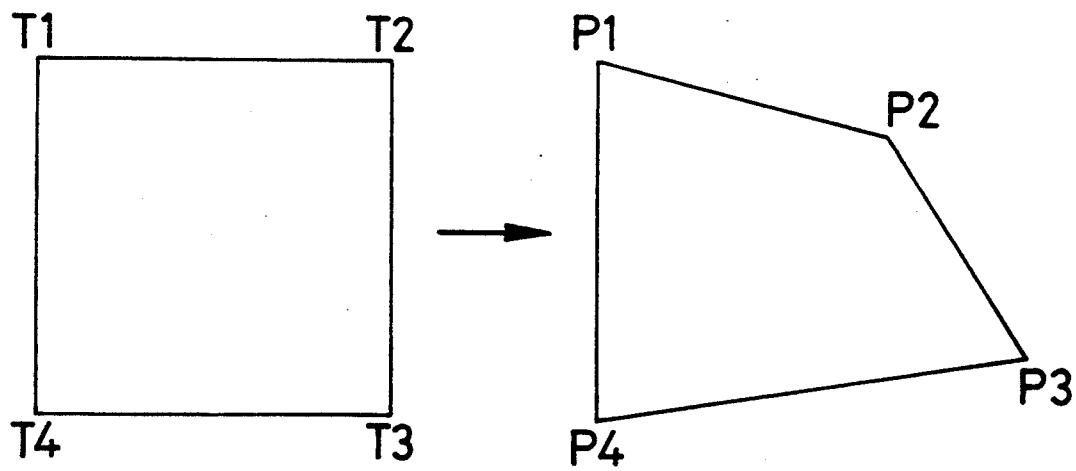
FIG. 20 shows the mapping of a square local area of an image to an arbitrary quadrilateral.
Figure 21:
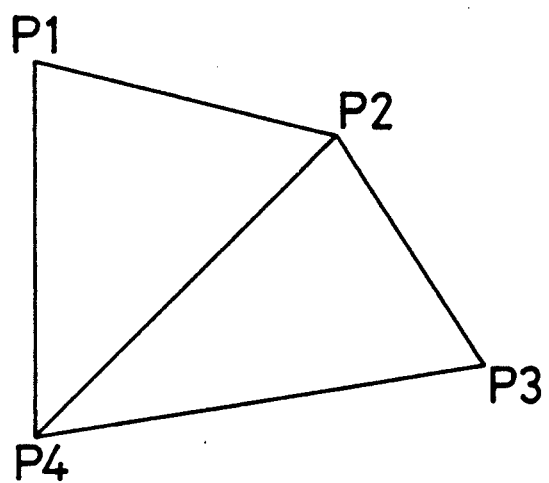
FIG. 21 shows how the arbitrary quadrilateral can be split into two triangles.
Figure 22:
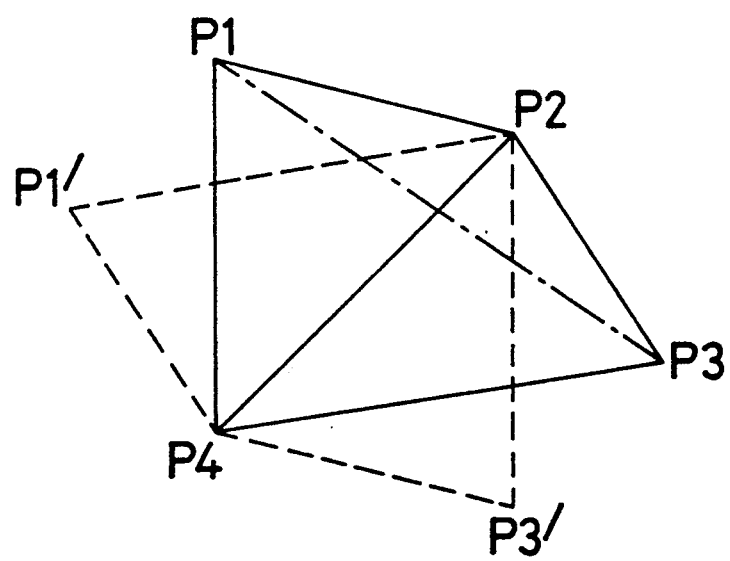
FIG. 22 shows how local scaling factors for two parallelograms can be calculated for the arbitrary quadrilateral.

FIG. 20 shows a case in which a square (for example) local image area T1-T2-T3-T4, which may be a single pixel or a tile comprising an array of pixels, is mapped (manipulated) to form an arbitrary quadrilateral P1-P2-P3-P4 whose shape does not approximate to that of a parallelogram. The quadrilateral P1-P2-P3-P4 can be split, as shown in FIG. 21, into two triangles. Values of lh and lv are then calculated as before. However, in this case, values of lh and lv are calculated for two sets of three sample or word positions rather than for one set of three such positions. Specifically, one calculation is effected for the position P1, using the positions P1, P2 and P4. This may be taken as a calculation for a parallelogram P1-P2-P3'-P4 (see FIG. 22), where the line P2-P3' is parallel to the line P1-P4 and the line P4-P3' is parallel to the line P1-P2. Another calculation is effected for the position P3, using the positions P3, P2 and P4. This may be taken as a calculation for a parallelogram P1'-P2-P3-P4, where the line P4-P1' is parallel to the line P3-P2 and the line P1'-P2 is parallel to the line P4-P3.

The calculated values of lh and lv for the position P1 are accurate at the position P1 and become progressively less accurate for positions in the quadrilateral P1-P2-P3-P4 increasingly farther away from the position P1. Similarly, the calculated values of lh and lv for the position P3 are accurate at the position P3 and become progressively less accurate for positions in the quadrilateral P1-P2-P3-P4 increasingly farther away from the position P3. The average of the two calculated values of lh and the average of the two calculated values of lv are taken to produce a single pair of values which hold reasonably good for the whole of the quadrilateral P1-P2-P3-P4. The averages of the two values of lh and lv are linear interpolations along the diagonal P1-P3 of the values calculated for each of the two halves of the quadrilateral P1-P2-P3-P4, that is the values calculated at the opposed corners P1 and P3 thereof.

One possible way in which the apparatus embodying the invention as described above could be modified, to perform the above-described operation of averaging between scaling factors obtained for opposite corners of a quadrilateral that does not necessarily at least approximately correspond to a parallelogram, will now be described with reference to FIG. 23, which is a schematic block diagram of a modified form of the local scaling factor computation 42 which can be used in this case.

Figure 23:
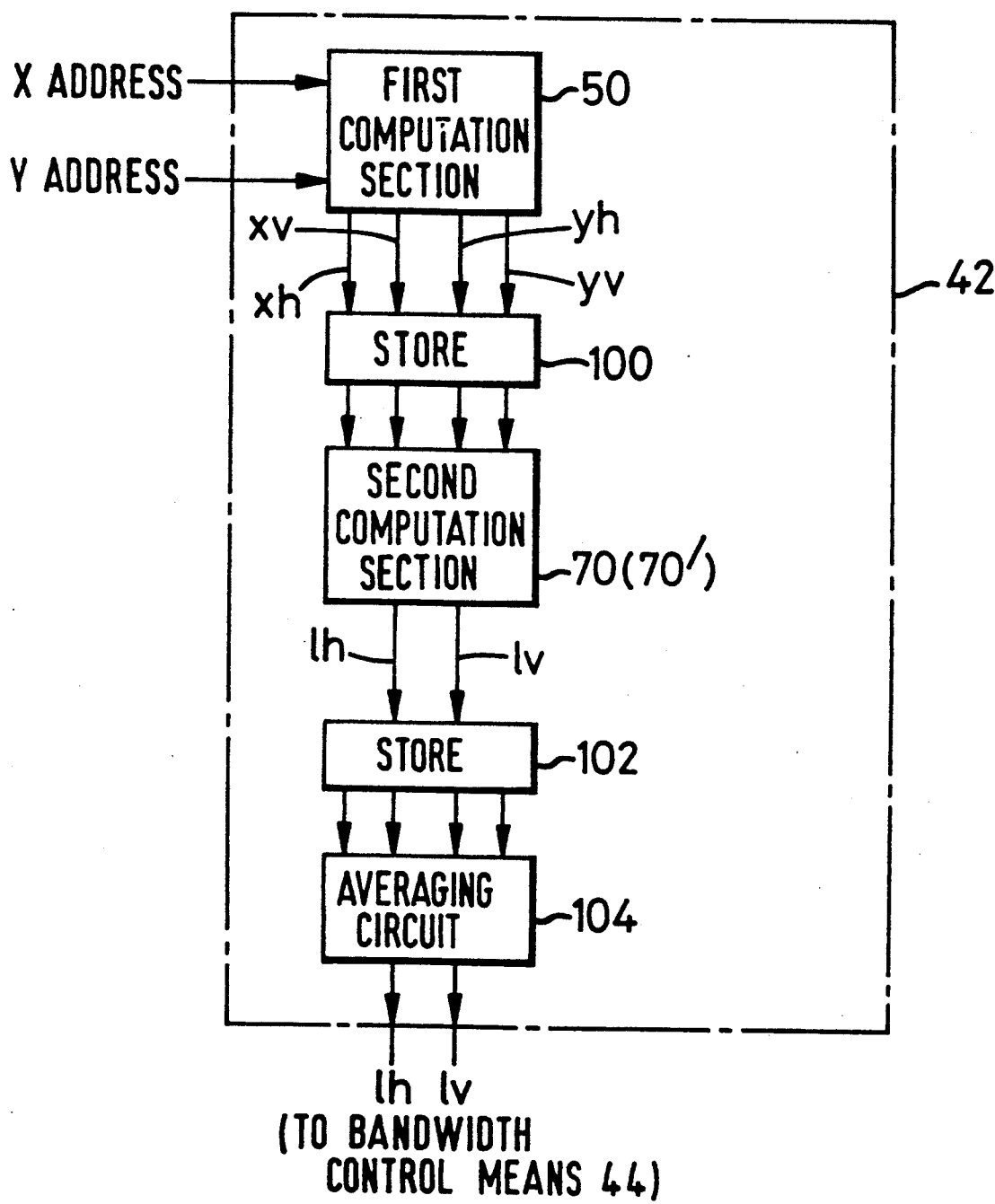
FIG. 23 is a schematic block diagram of a local scaling factor computation means used in another embodiment of the invention.

Referring to FIG. 23, the first computation section 50 functions as before to calculate the values xh, yh and yv from the x and y address components supplied thereto by the address generator 14. In this case, two sets of these values are generated for each area. That is, referring for example to FIG. 22, one set of the values is generated from the addresses of the points P1, P2 and P4 and another set of the values is generated from the addresses of the points P3, P2 and P4. These values are passed to and stored in a store 100 where the values xh and xv are stored for the number of lines (one in the case of a single pixel-sized area or V in the case of a tile) equal to the vertical extent of each area and the values yh and yv are stored for the number of lines (one in the case of a single pixel-sized area or U in the case of a tile) equal to the horizontal extent of each area.

When the values of xh, xv, yh and yv necessary to compute therefrom the corresponding values of lh and lv have been accumulated in the store 100, the values of xh, xv and yv are transferred from the store 100 to the second computation section 70 (or 70') which computes the corresponding values of lh and lv. These values of lh and lv are then transferred to a store 102.

When the two pairs of values of lh and lv which have to be averaged to produce average values for each area have been accumulated in the store 102, the two pairs of values are transferred to an averaging circuit 104 which forms the averages and outputs them to the bandwidth control means 44.

In an extension of the modification just described, two sets of the values lh and lv are calculated for opposite corners of the manipulated local area as before. However, instead of the two values of lh and the two values of lv each being averaged to produce an average value lh and an average value of lv for use over the whole area, a weighted average of the two sets of values is calculated for each of a plurality of different positions within the area (for example for each pixel within a tile), the weighting for each position depending upon the location of the position with respect to the opposite corners of the area, that is along a line that passes through said portion, that extends between a pair of edges of the manipulated area and that is parallel to the diagonal of the area joining the two opposite corners thereof.

Although the invention is applicable specifically in the creation of digital video effects, it should be appreciated that the invention is more generally applicable to the processing of digital image signals in a variety of other applications.

Although illustrative embodiments of the invention have been described in detail herein with reference to the accompanying drawings, it is to be understood that the invention is not limited to those precise embodiments, and that various changes and modifications can be effected therein by one skilled in the art without departing from the scope and spirit of the invention as defined by the appended claims.

I claim:

1. An image processing apparatus for manipulating an input image by rotating and/or compressing said input image, said apparatus comprising:

receiving means for receiving a digital input signal having a plurality of words representing said input image in which each of said words has a respective position with horizontal and vertical coordinates; and manipulating means for manipulating said input image so as to form a manipulated image, said manipulating means including address generating means for generating respective addresses for successive words of said digital input signal; local scaling factor computation means computing respective horizontal and vertical local scaling factors representing amounts of compression and rotation in horizontal and vertical directions, respectively, for successive local areas of said manipulated image based on sets of said addresses generated for sets of said words of said input image in which each of said sets of said words includes first and second words that are horizontally spaced in said input image and a third word that is aligned vertically with said second word in said input image, each of said horizontal local scaling factors corresponding to the length of a line that extends perpendicularly from a line passing through the respective positions of said second and third words to the position of said first word in each of said successive local areas in said manipulated image and each of said vertical local scaling factors corresponding to the length of a line that extends perpendicularly from a line passing through the respective positions of said first and second words to the position of said third word in each of said successive local areas in said manipulated image; bandwidth control means responsive to the successive horizontal and vertical local scaling factors for generating horizontal and vertical bandwidth control signals; and a digital filter having variable horizontal and vertical bandwidths for respectively varying said horizontal and vertical bandwidths in response to said horizontal and vertical bandwidth control signals and for performing two-dimensional filtering of said digital input signal so as to minimize the amount of aliasing errors that would be caused by the manipulation of said local areas.

2. Apparatus according to claim 1, wherein said first and second words in each of said sets of said words in said input image are horizontally adjacent to one another and said second and third words in each of said sets of said words in said input image are vertically adjacent to one another.

3. Apparatus according to claim 1, wherein said first and second words in each of said sets of said words in said input image are horizontally spaced from one another by at least one intervening word and said second and third words in each of said sets of said words in said input image are vertically spaced from one another by at least one intervening word.

4. Apparatus according to claim 1, wherein said local scaling factor computation means computes two of said horizontal and two of said vertical local scaling factors for each of said local areas, one of said horizontal and one of said vertical scaling factors for each of said local areas being computed from the respective positions of said first, second and third words in said manipulated image, and the other of said two horizontal and two vertical scaling factors being similarly computed from the respective positions in said manipulated image of said first and third words and a fourth word that is aligned horizontally with said third word in said input image and is aligned vertically with said first word in said input image; and wherein said local scaling factor computation means respectively averages said two horizontal and said two vertical local scaling factors for each of said local areas so as to produce a respective average horizontal local scaling factor and a respective average vertical local scaling factor for supply to said bandwidth control means.

5. Apparatus according to claim 1, wherein said local scaling factor computation means computes two of said horizontal and two of said vertical local scaling factors for each of said local areas, said local areas each having four edges, one of said horizontal and one of said vertical scaling factors for each of said local areas being computed from the respective positions of said first, second and third words in said manipulated image, and the other of said two horizontal and two vertical scaling factors being similarly computed from the respective positions in said manipulated image of said first and third words and a fourth word that is aligned horizontally with said third word in said input image and is aligned vertically with said first word in said input image; and wherein said local scaling factor computation means produces for each of a plurality of positions within each of said local areas a respective average horizontal local scaling factor that is a weighted average of said two horizontal scaling factors of the respective local area and a respective average vertical local scaling factor that is a weighted average of said two vertical scaling factors of the respective local area, said average horizontal and average vertical local scaling factors being supplied to said bandwidth control means, the weighting of each one of said plurality of positions being determined by the respective location of said each one along a line which passes through said each one, extends between a pair of said edges of the respective local area, and is parallel to a diagonal line which connects the positions of said first and third words in said manipulated image.

6. Apparatus according to claim 1, wherein said digital filter includes a finite impulse response filter and in which said horizontal and vertical bandwidth control signals generated by said bandwidth control means include a set of respective weighting coefficients for each of said sets of said addresses for supply to said digital filter so as to cause said digital filter to have horizontal and vertical bandwidths which correspond to said horizontal and vertical local scaling factors, respectively.

7. Apparatus according to claim 6, wherein said bandwidth control means includes look-up table means for storing a plurality of sets of said weighting coefficients which correspond to respective different values of said horizontal and vertical local scaling factors, and in which said bandwidth control means supplies to said digital filter the set of weighting coefficients which corresponds to the respective values of said horizontal and vertical local scaling factors computed by said local scaling factor computation means for each of said sets of said addresses.

8. A method for manipulating an input image by rotating and/or compressing said input image, said method comprising the steps of:

receiving a digital input signal having a plurality of words representing said input image in which each of said words has a respective position with horizontal and vertical coordinates; and manipulating said input image so as to form a manipulated image, the step of manipulating including generating respective addresses for successive words of said digital input signal; computing respective horizontal and vertical local scaling factors representing amounts of compression and rotation in horizontal and vertical directions, respectively, for successive local areas of said manipulated image based on sets of said addresses generated for sets of said words of said input image in which each of said sets of said words includes first and second words that are horizontally spaced in said input image and a third word that is aligned vertically with said second word in said input image, each of said horizontal local scaling factors corresponding to the length of a line that extends perpendicularly from a line passing through the respective positions of said second and third words to the position of said first word in each of said successive local areas in said manipulated image and each of said vertical local scaling factors corresponding to the length of a line that extends perpendicularly from a line passing through the respective positions of said first and second words to the position of said third word in each of said successive local areas in said manipulated image; generating horizontal and vertical bandwidth control signals in response to the successive horizontal and vertical local scaling factors; varying horizontal and vertical bandwidths of a digital filter in response to said horizontal and vertical bandwidth control signals; and performing two-dimensional filtering of said digital input signal by said digital filter so as to minimize the amount of aliasing errors that would be caused by the manipulation of said local areas.

9. A method according to claim 8, wherein said first and second words in each of said sets of said words in said input image are horizontally adjacent to one another and said second and third words in each of said sets of said words in said input image are vertically adjacent to one another.

10. A method according to claim 8, wherein said first and second words in each of said sets of said words in said input image are horizontally spaced from one another by at least one intervening word and said second and third words in each of said sets of said words in said input image are vertically spaced from one another by at least one intervening word.

11. A method according to claim 8, wherein said computing of said respective horizontal and vertical local scaling factors includes:

computing two of said horizontal and two of said vertical local scaling factors for each of said local areas, one of said horizontal and one of said vertical scaling factors for each of said local areas being computed from the respective positions of said first, second and third words in said manipulated image, and the other of said two horizontal and two vertical scaling factors being similarly computed from the respective positions in said manipulated image of said first and third words and a fourth word that is aligned horizontally with said third word in said input image and that is aligned vertically with said first word in said input image; and averaging said two horizontal and said two vertical local scaling factors for each of said local areas so as to produce a respective average horizontal local scaling factor and a respective average vertical local scaling factor which are used for generating said horizontal and vertical bandwidth control signals which are utilized for varying said horizontal and vertical bandwidths of said digital filter.

12. A method according to claim 8, wherein said computing of said respective horizontal and vertical local scaling factors includes:

computing two of said horizontal and two of said vertical local scaling factors for each of said local areas, said local areas each having four edges, one of said horizontal and one of said vertical scaling factors for each of said local areas being computed from the respective positions of said first, second and third words in said manipulated image, and the other of said two horizontal and two vertical scaling factors being similarly computed from the respective positions in said manipulated image of said first and third words and a fourth word that is aligned horizontally with said third word in said input image and that is aligned vertically with said first word in said input image; and producing for each of a plurality of positions within each of said local areas a respective average horizontal local scaling factor that is a weighted average of said two horizontal scaling factors of the respective local area and a respective average vertical local scaling factor that is a weighted average of said two vertical scaling factors of the respective local area, said average horizontal and vertical local scaling factors being used for generating said horizontal and vertical bandwidth control signals which are utilized for varying said horizontal and vertical bandwidth of said digital filter, the weighting of each one of said plurality of positions being determined by the respective location of said each one along a line which passes through said each one, extends between a pair of said edges of the respective local area, and is parallel to a diagonal line which connects the positions of said first and third words in said manipulated image.

13. A method according to claim 8, wherein said digital filter includes a finite impulse response filter and said horizontal and vertical bandwidth control signals include a set of respective weighting coefficients for each of said sets of said addresses for supply to said digital filter so as to cause said digital filter to have horizontal and vertical bandwidths which correspond to said horizontal and vertical local scaling factors, respectively.

14. A method according to claim 13, wherein a plurality of sets of said weighting coefficients which correspond to respective different values of said horizontal and vertical local scaling factors are stored in look-up table means and the set of weighting coefficients which correspond to the respective computed values of said horizontal and vertical local scaling factors for each of said sets of said addresses are supplied to said digital filter.

* * * * *